(12) United States Patent
Rahman et al.

(10) Patent No.: US 11,659,539 B2
(45) Date of Patent: May 23, 2023

(54) METHOD AND APPARATUS FOR EVENT-BASED UPLINK TRANSMIT BEAM SWITCH

(71) Applicant: Samsung Electronics Co., Ltd., Suwon-si (KR)

(72) Inventors: Md. Saifur Rahman, Plano, TX (US); Eko Onggosanusi, Coppell, TX (US); Emad N. Farag, Flanders, NJ (US)

(73) Assignee: Samsung Electronics Co., Ltd., Suwon-si (KR)

( * ) Notice: Subject to any disclaimer, the term of this patent is extended or adjusted under 35 U.S.C. 154(b) by 29 days.

(21) Appl. No.: 17/349,680

(22) Filed: Jun. 16, 2021

(65) Prior Publication Data
US 2021/0410130 A1    Dec. 30, 2021

Related U.S. Application Data

(60) Provisional application No. 63/052,830, filed on Jul. 16, 2020, provisional application No. 63/044,838, filed on Jun. 26, 2020.

(51) Int. Cl.
*H04W 72/04* (2023.01)
*H04W 72/044* (2023.01)
*H04W 72/10* (2009.01)

(52) U.S. Cl.
CPC ......... *H04W 72/046* (2013.01); *H04W 72/10* (2013.01)

(58) Field of Classification Search
CPC ............... H04W 72/046; H04W 72/10; H04W 72/0413; H04L 5/005; H04L 5/0055; H04L 5/0023; H04L 5/0048; H04L 5/0053; H04L 5/0094; H04B 7/0465; H04B 7/0695; H04B 7/0404; H04B 7/0617; H04B 7/0602
See application file for complete search history.

(56) References Cited

U.S. PATENT DOCUMENTS

2020/0229178 A1    7/2020  Gao et al.

FOREIGN PATENT DOCUMENTS

| EP | 3886336 A1 * | 9/2021 | |
| KR | 10-2020-0037389 A | 4/2020 | |
| WO | WO-2018009462 A1 * | 1/2018 | |
| WO | WO-2021154372 A1 * | 8/2021 | |
| WO | WO-2021207567 A1 * | 10/2021 | ........... H04B 17/102 |

OTHER PUBLICATIONS

"3rd Generation Partnership Project; Technical Specification Group Radio Access Network; Evolved Universal Terrestrial Radio Access (E-UTRA); Physical channels and modulation (Release 16)", 3GPP TS 36.211 V16.5.0, Mar. 2021, 249 pages.
(Continued)

*Primary Examiner* — Thai Nguyen

(57) ABSTRACT

A method for operating a user equipment comprises receiving configuration information including information on a beam indication indicating N uplink (UL) transmit beams, where N>1; receiving the beam indication; determining whether an event is detected; selecting a beam from the N UL transmit beams based on whether the event is detected or not; and transmitting an UL transmission using the selected beam, wherein the beam refers to a spatial property used to receive or transmit a source reference signal (RS).

20 Claims, 17 Drawing Sheets

(56) References Cited

OTHER PUBLICATIONS

"3rd Generation Partnership Project; Technical Specification Group Radio Access Network; Evolved Universal Terrestrial Radio Access (E-UTRA); Multiplexing and channel coding (Release 16)", 3GPP TS 36.212 V16.5.0, Mar. 2021, 255 pages.
"3rd Generation Partnership Project; Technical Specification Group Radio Access Network; Evolved Universal Terrestrial Radio Access (E-UTRA); Physical layer procedures (Release 16)", 3GPP TS 36.213 V16.5.0, Mar. 2021, 577 pages.
"LTE; Evolved Universal Terrestrial Radio Access (E-UTRA); Medium Access Control (MAC) protocol specification (3GPP TS 36.321 version 16.4.0 Release 16)", ETSI TS 136 321 V16.4.0, Apr. 2021, 144 pages.
"LTE; Evolved Universal Terrestrial Radio Access (E-UTRA); Radio Resource Control (RRC); Protocol specification (3GPP TS 36.331 version 16.4.0 Release 16)", ETSI TS 136 331 V16.4.0, Apr. 2021, 1093 pages.
"5G; NR; Physical channels and modulation (3GPP TS 38.211 version 16.5.0, Release 16)", ETSI TS 138 211 V16.5.0, Apr. 2021, 138 pages.
"5G; NR; Multiplexing and channel coding (3GPP TS 38.212 version 16.5.0 Release 16)", ETSI TS 138 212 V16.5.0, Apr. 2021, 155 pages.
"5G; NR; Physical layer procedures for control (3GPP TS 38.213 version 16.4.0 Release 16)", ETSI TS 138 213 V16.4.0, Jan. 2021, 185 pages.
"5G; NR; Physical layer procedures for data (3GPP TS 38.214 version 16.4.0 Release 16)", ETSI TS 138 214 V16.4.0, Jan. 2021, 173 pages.
"5G; NR; Physical layer measurements (3GPP TS 38.215 version 16.4.0 Release 16)", ETSI TS 138 215 V16.4.0, Jan. 2021, 31 pages.
"5G; NR; Medium Access Control (MAC) protocol specification (3GPP TS 38.321 version 16.4.0 Release 16)", ETSI TS 138 321 V16.4.0, Apr. 2021, 159 pages.
"5G; NR; Radio Resource Control (RRC); Protocol specification (3GPP TS 38.331 version 16.4.1 Release 16)", ETSI TS 138 331 V16.4.1, Apr. 2021, 932 pages.
OPPO, "Discussion on Multi-beam Operation Enhancements", 3GPP TSG RAN WG1 #98, Aug. 26-30, 2019, R1-1908352, 9 pages.
Apple Inc., "Remaining Issues on Multi-beam operation", 3GPP TSG RAN WG1 #98, Aug. 26-30, 2019, R1-1909048, 12 pages.
Nokia et al., "Enhancements on Multi-beam Operation", 3GPP TSG RAN WG1 #98, Aug. 26-30, 2019, R1-1909210, 17 pages.
Vivo, "Further discussion on Multi-Beam Operation", 3GPP TSG RAN WG1 #98, Aug. 26-30, 2019, R1-1908167, 12 pages.
Notification of Transmittal of the International Search Report and the Written Opinion of the International Searching Authority, or the Declaration dated Sep. 28, 2021 in connection with International Patent Application No. PCT/K2021/008021, 9 pages.

\* cited by examiner

METHOD AND APPARATUS FOR EVENT-BASED UPLINK TRANSMIT BEAM SWITCH

CROSS-REFERENCE TO RELATED APPLICATIONS AND CLAIM OF PRIORITY

The present application claims priority to U.S. Provisional Patent Application No. 63/044,838, filed on Jun. 26, 2020, and U.S. Provisional Patent Application No. 63/052,830, filed on Jul. 16, 2020. The content of the above-identified patent documents is incorporated herein by reference.

TECHNICAL FIELD

The present disclosure relates generally to wireless communication systems and more specifically to event-based uplink transmit beam switching.

BACKGROUND

Understanding and correctly estimating the channel between a user equipment (UE) and a gNode B (gNB) is important for efficient and effective wireless communication. In order to correctly estimate the downlink (DL) channel conditions, the gNB may transmit a reference signal, e.g., CSI-RS, to the UE for DL channel measurement, and the UE may report (e.g., feedback) information about channel measurement, e.g., CSI, to the gNB. Likewise, for uplink (UL), the UE may transmit reference signal, e.g., SRS, to the gNB for UL channel measurement. With the DL and UL channel measurements, the gNB is able to select appropriate communication parameters to efficiently and effectively perform wireless data communication with the UE. For a millimeter wave communication systems, the reference signal can correspond to a spatial beam, and the CSI can correspond to a beam report which indicates a preferred spatial beam for communication. In such beamformed systems, a beam indication mechanism is needed in order to align the spatial beams at both gNB and UE.

SUMMARY

Embodiments of the present disclosure provide methods and apparatuses to enable event-based uplink transmit beam switching.

In one embodiment, a UE in a wireless communication system is provided. The UE includes a transceiver configured to: receive configuration information including information on a beam indication indicating N uplink (UL) transmit beams, where N>1, and receive the beam indication. The UE further includes a processor operably coupled to the transceiver. The processor is configured to: determine whether an event is detected, and select a beam from the N UL transmit beams based on whether the event is detected or not. The transceiver is further configured to transmit an UL transmission using the selected beam, and the beam refers to a spatial property used to receive or transmit a source reference signal (RS).

In another embodiment, a BS in a wireless communication system is provided. The BS includes a processor configured to generate configuration information including information on a beam indication indicating N uplink (UL) transmit beams, where N>1, and generate the beam indication. The BS further includes a transceiver operably coupled to the processor. The transceiver is configured to: transmit the configuration information, transmit the beam indication, and receive an UL transmission transmitted using a beam from the N UL transmit beams, wherein the beam is selected based on whether an event is detected, and wherein the beam refers to a spatial property used to receive or transmit a source reference signal (RS).

In yet another embodiment, a method for operating a UE is provided. The method comprises: receiving configuration information including information on a beam indication indicating N uplink (UL) transmit beams, where N>1; receiving the beam indication; determining whether an event is detected; selecting a beam from the N UL transmit beams based on whether the event is detected or not; and transmitting an UL transmission using the selected beam, wherein the beam refers to a spatial property used to receive or transmit a source reference signal (RS).

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system, or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
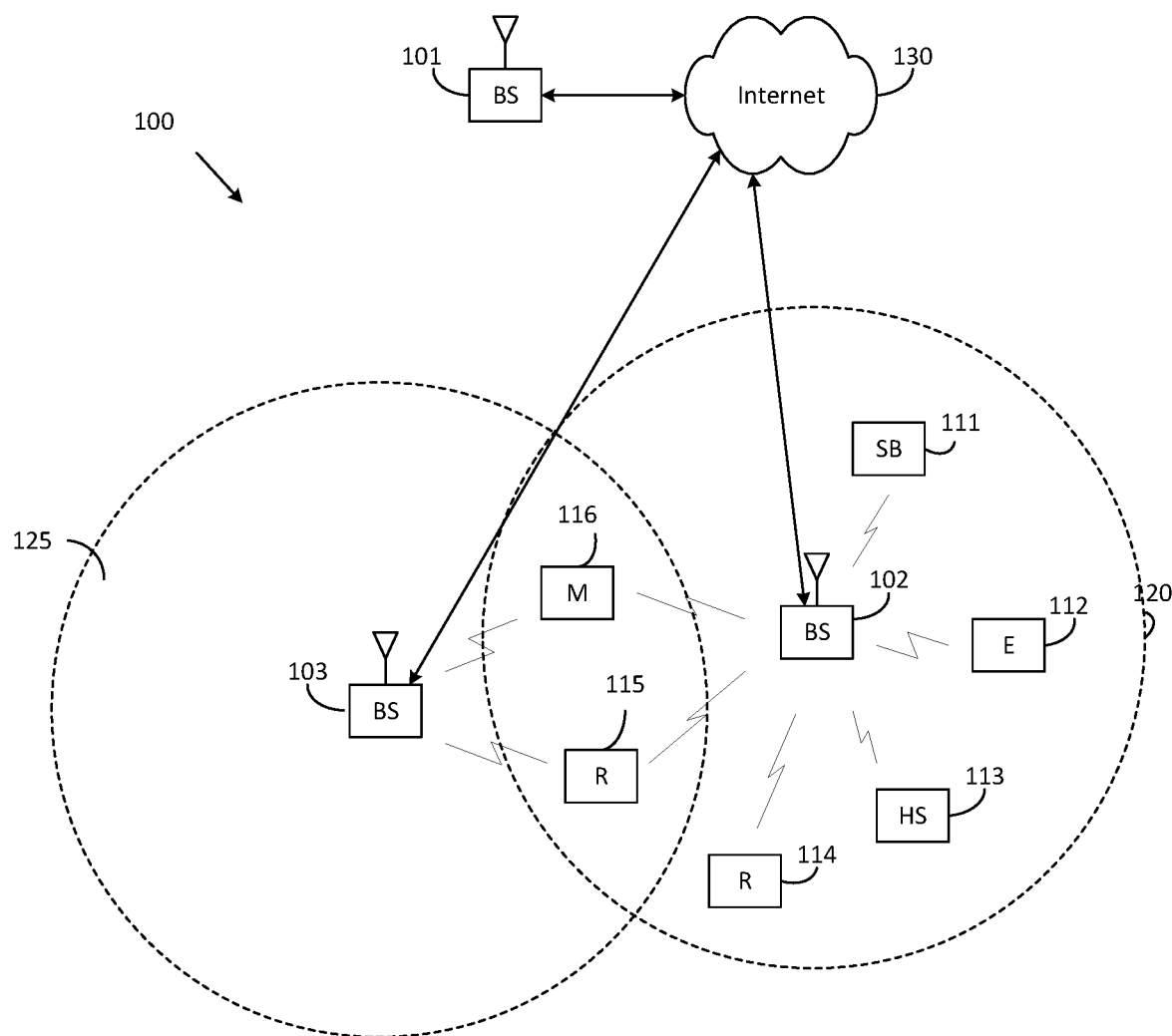
FIG. 1 illustrates an example wireless network according to embodiments of the present disclosure.

FIG. 1 through FIG. 19, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

The following documents and standards descriptions are hereby incorporated by reference into the present disclosure as if fully set forth herein: 3GPP TS 36.211 v16.5.0, "E-UTRA, Physical channels and modulation" (herein "REF 1"); 3GPP TS 36.212 v16.5.0, "E-UTRA, Multiplexing and Channel coding" (herein "REF 2"); 3GPP TS 36.213 v16.5.0, "E-UTRA, Physical Layer Procedures" (herein "REF 3"); 3GPP TS 36.321 v16.4.0, "E-UTRA, Medium Access Control (MAC) protocol specification" (herein "REF 4"); 3GPP TS 36.331 v16.4.0, "E-UTRA, Radio Resource Control (RRC) protocol specification" (herein "REF 5"); 3GPP TS 38.211 v16.5.0, "NR, Physical channels and modulation" (herein "REF 6"); 3GPP TS 38.212 v16.5.0, "NR, Multiplexing and Channel coding" (herein "REF 7"); 3GPP TS 38.213 v16.4.0, "NR, Physical Layer Procedures for Control" (herein "REF 8"); 3GPP TS 38.214 v16.4.0, "NR, Physical Layer Procedures for Data" (herein "REF 9"); 3GPP TS 38.215 v16.4.0, "NR, Physical Layer Measurements" (herein "REF 10"); 3GPP TS 38.321 v16.4.0, "NR, Medium Access Control (MAC) protocol specification" (herein "REF 11"); and 3GPP TS 38.331 v16.4.1, "NR, Radio Resource Control (RRC) Protocol Specification" (herein "REF 12").

Aspects, features, and advantages of the disclosure are readily apparent from the following detailed description, simply by illustrating a number of particular embodiments and implementations, including the best mode contemplated for carrying out the disclosure. The disclosure is also capable of other and different embodiments, and its several details can be modified in various obvious respects, all without departing from the spirit and scope of the disclosure. Accordingly, the drawings and description are to be regarded as illustrative in nature, and not as restrictive. The disclosure is illustrated by way of example, and not by way of limitation, in the figures of the accompanying drawings.

In the following, for brevity, both FDD and TDD are considered as the duplex method for both DL and UL signaling.

Although exemplary descriptions and embodiments to follow assume orthogonal frequency division multiplexing (OFDM) or orthogonal frequency division multiple access (OFDMA), the present disclosure can be extended to other OFDM-based transmission waveforms or multiple access schemes such as filtered OFDM (F-OFDM).

To meet the demand for wireless data traffic having increased since deployment of 4G communication systems and to enable various vertical applications, 5G/NR communication systems have been developed and are currently being deployed. The 5G/NR communication system is considered to be implemented in higher frequency (mmWave) bands, e.g., 28 GHz or 60 GHz bands, so as to accomplish higher data rates or in lower frequency bands, such as 6

GHz, to enable robust coverage and mobility support. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G/NR communication systems.

In addition, in 5G/NR communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like.

The discussion of 5G systems and frequency bands associated therewith is for reference as certain embodiments of the present disclosure may be implemented in 5G systems. However, the present disclosure is not limited to 5G systems or the frequency bands associated therewith, and embodiments of the present disclosure may be utilized in connection with any frequency band. For example, aspects of the present disclosure may also be applied to deployment of 5G communication systems, 6G or even later releases which may use terahertz (THz) bands.

Figure 2:
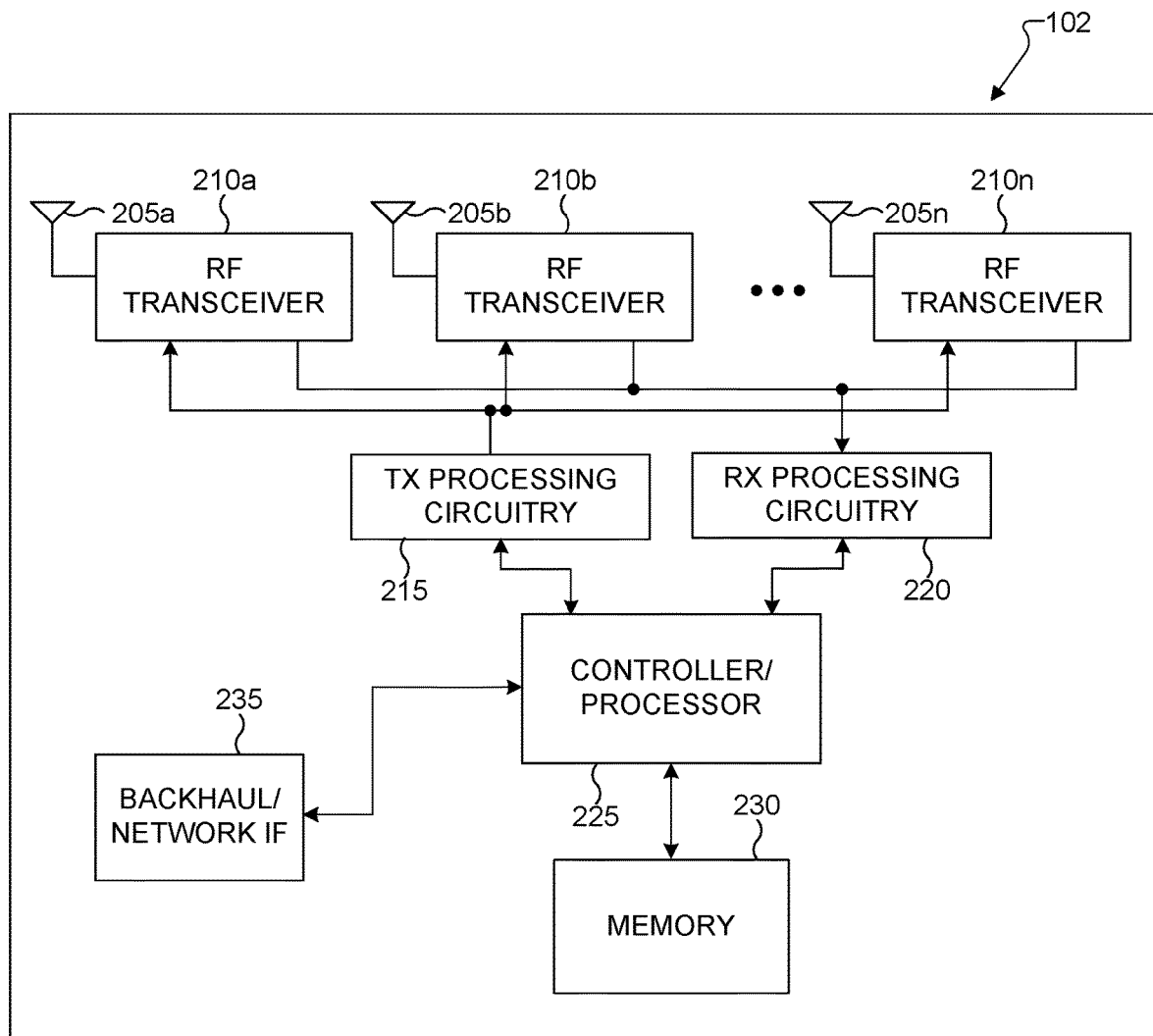
FIG. 2 illustrates an example gNB according to embodiments of the present disclosure.
Figure 3:
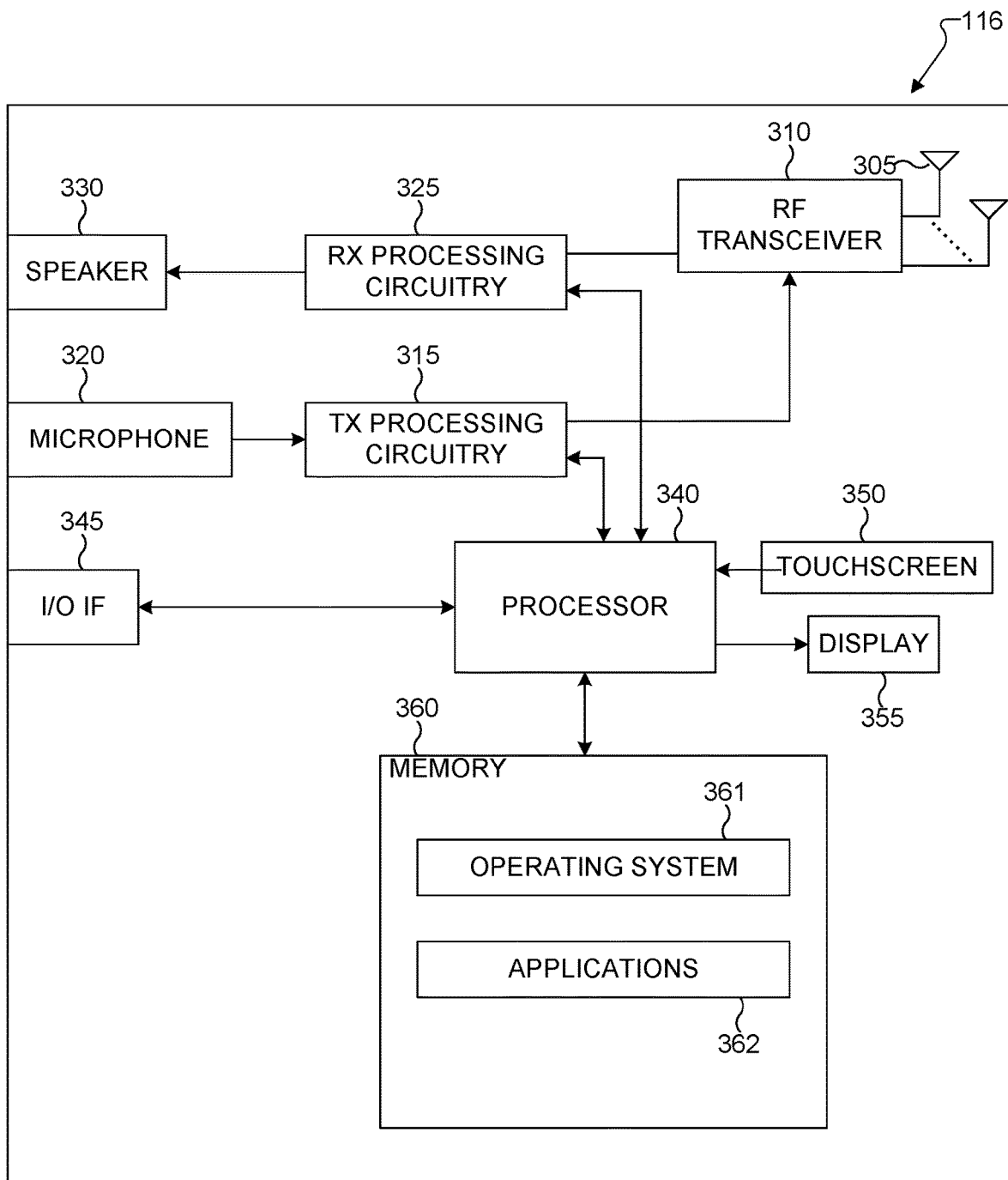
FIG. 3 illustrates an example UE according to embodiments of the present disclosure.

FIGS. 1-4B below describe various embodiments implemented in wireless communications systems and with the use of orthogonal frequency division multiplexing (OFDM) or orthogonal frequency division multiple access (OFDMA) communication techniques. The descriptions of FIGS. 1-3 are not meant to imply physical or architectural limitations to the manner in which different embodiments may be implemented. Different embodiments of the present disclosure may be implemented in any suitably-arranged communications system. The present disclosure covers several components which can be used in conjunction or in combination with one another or can operate as standalone schemes.

FIG. 1 illustrates an example wireless network according to embodiments of the present disclosure. The embodiment of the wireless network shown in FIG. 1 is for illustration only. Other embodiments of the wireless network 100 could be used without departing from the scope of this disclosure.

As shown in FIG. 1, the wireless network includes a gNB 101, a gNB 102, and a gNB 103. The gNB 101 communicates with the gNB 102 and the gNB 103. The gNB 101 also communicates with at least one network 130, such as the Internet, a proprietary Internet Protocol (IP) network, or other data network.

The gNB 102 provides wireless broadband access to the network 130 for a first plurality of user equipments (UEs) within a coverage area 120 of the gNB 102. The first plurality of UEs includes a UE 111, which may be located in a small business; a UE 112, which may be located in an enterprise (E); a UE 113, which may be located in a WiFi hotspot (HS); a UE 114, which may be located in a first residence (R); a UE 115, which may be located in a second residence (R); and a UE 116, which may be a mobile device (M), such as a cell phone, a wireless laptop, a wireless PDA, or the like. The gNB 103 provides wireless broadband access to the network 130 for a second plurality of UEs within a coverage area 125 of the gNB 103. The second plurality of UEs includes the UE 115 and the UE 116. In some embodiments, one or more of the gNBs 101-103 may communicate with each other and with the UEs 111-116 using 5G, LTE, LTE-A, WiMAX, WiFi, or other wireless communication techniques.

Depending on the network type, the term "base station" or "BS" can refer to any component (or collection of components) configured to provide wireless access to a network, such as transmit point (TP), transmit-receive point (TRP), an enhanced base station (eNodeB or eNB), a 5G base station (gNB), a macrocell, a femtocell, a WiFi access point (AP), or other wirelessly enabled devices. Base stations may provide wireless access in accordance with one or more wireless communication protocols, e.g., 5G 3GPP new radio interface/access (NR), long term evolution (LTE), LTE advanced (LTE-A), high speed packet access (HSPA), Wi-Fi 802.11a/b/g/n/ac, etc. For the sake of convenience, the terms "BS" and "TRP" are used interchangeably in this patent document to refer to network infrastructure components that provide wireless access to remote terminals. Also, depending on the network type, the term "user equipment" or "UE" can refer to any component such as "mobile station," "subscriber station," "remote terminal," "wireless terminal," "receive point," or "user device." For the sake of convenience, the terms "user equipment" and "UE" are used in this patent document to refer to remote wireless equipment that wirelessly accesses a BS, whether the UE is a mobile device (such as a mobile telephone or smartphone) or is normally considered a stationary device (such as a desktop computer or vending machine).

Dotted lines show the approximate extents of the coverage areas 120 and 125, which are shown as approximately circular for the purposes of illustration and explanation only. It should be clearly understood that the coverage areas associated with gNBs, such as the coverage areas 120 and 125, may have other shapes, including irregular shapes, depending upon the configuration of the gNBs and variations in the radio environment associated with natural and man-made obstructions.

As described in more detail below, one or more of the UEs 111-116 include circuitry, programing, or a combination thereof, for receiving configuration information including information on a beam indication indicating N uplink (UL) transmit beams, where N>1; receiving the beam indication; determining whether an event is detected; selecting a beam from the N UL transmit beams based on whether the event is detected or not; and transmitting an UL transmission using the selected beam, wherein the beam refers to a spatial property used to receive or transmit a source reference signal (RS). One or more of the gNBs 101-103 includes circuitry, programing, or a combination thereof, for generating configuration information including information on a beam indication indicating N uplink (UL) transmit beams, where N>1, generating the beam indication, transmitting the configuration information, transmitting the beam indication, and receiving an UL transmission transmitted using a beam from the N UL transmit beams, wherein the beam is selected based on whether an event is detected, and wherein the beam refers to a spatial property used to receive or transmit a source reference signal (RS).

Although FIG. 1 illustrates one example of a wireless network, various changes may be made to FIG. 1. For example, the wireless network could include any number of gNBs and any number of UEs in any suitable arrangement. Also, the gNB 101 could communicate directly with any number of UEs and provide those UEs with wireless broadband access to the network 130. Similarly, each gNB 102-103 could communicate directly with the network 130 and provide UEs with direct wireless broadband access to the network 130. Further, the gNBs 101, 102, and/or 103 could provide access to other or additional external networks, such as external telephone networks or other types of data networks.

FIG. 2 illustrates an example gNB 102 according to embodiments of the present disclosure. The embodiment of the gNB 102 illustrated in FIG. 2 is for illustration only, and the gNBs 101 and 103 of FIG. 1 could have the same or similar configuration. However, gNBs come in a wide variety of configurations, and FIG. 2 does not limit the scope of this disclosure to any particular implementation of a gNB.

As shown in FIG. 2, the gNB 102 includes multiple antennas 205a-205n, multiple RF transceivers 210a-210n, transmit (TX) processing circuitry 215, and receive (RX) processing circuitry 220. The gNB 102 also includes a controller/processor 225, a memory 230, and a backhaul or network interface 235.

The RF transceivers 210a-210n receive, from the antennas 205a-205n, incoming RF signals, such as signals transmitted by UEs in the network 100. The RF transceivers 210a-210n down-convert the incoming RF signals to generate IF or baseband signals. The IF or baseband signals are sent to the RX processing circuitry 220, which generates processed baseband signals by filtering, decoding, and/or digitizing the baseband or IF signals. The RX processing circuitry 220 transmits the processed baseband signals to the controller/processor 225 for further processing.

The TX processing circuitry 215 receives analog or digital data (such as voice data, web data, e-mail, or interactive video game data) from the controller/processor 225. The TX processing circuitry 215 encodes, multiplexes, and/or digitizes the outgoing baseband data to generate processed baseband or IF signals. The RF transceivers 210a-210n receive the outgoing processed baseband or IF signals from the TX processing circuitry 215 and up-converts the baseband or IF signals to RF signals that are transmitted via the antennas 205a-205n.

The controller/processor 225 can include one or more processors or other processing devices that control the overall operation of the gNB 102. For example, the controller/processor 225 could control the reception of forward channel signals and the transmission of reverse channel signals by the RF transceivers 210a-210n, the RX processing circuitry 220, and the TX processing circuitry 215 in accordance with well-known principles. The controller/processor 225 could support additional functions as well, such as more advanced wireless communication functions.

For instance, the controller/processor 225 could support beam forming or directional routing operations in which outgoing signals from multiple antennas 205a-205n are weighted differently to effectively steer the outgoing signals in a desired direction. Any of a wide variety of other functions could be supported in the gNB 102 by the controller/processor 225.

The controller/processor 225 is also capable of executing programs and other processes resident in the memory 230, such as an OS. The controller/processor 225 can move data into or out of the memory 230 as required by an executing process.

The controller/processor 225 is also coupled to the backhaul or network interface 235. The backhaul or network interface 235 allows the gNB 102 to communicate with other devices or systems over a backhaul connection or over a network. The interface 235 could support communications over any suitable wired or wireless connection(s). For example, when the gNB 102 is implemented as part of a cellular communication system (such as one supporting 5G, LTE, or LTE-A), the interface 235 could allow the gNB 102 to communicate with other gNBs over a wired or wireless backhaul connection. When the gNB 102 is implemented as an access point, the interface 235 could allow the gNB 102 to communicate over a wired or wireless local area network or over a wired or wireless connection to a larger network (such as the Internet). The interface 235 includes any suitable structure supporting communications over a wired or wireless connection, such as an Ethernet or RF transceiver.

The memory 230 is coupled to the controller/processor 225. Part of the memory 230 could include a RAM, and another part of the memory 230 could include a Flash memory or other ROM.

Although FIG. 2 illustrates one example of gNB 102, various changes may be made to FIG. 2. For example, the gNB 102 could include any number of each component shown in FIG. 2. As a particular example, an access point could include a number of interfaces 235, and the controller/processor 225 could support routing functions to route data between different network addresses. As another particular example, while shown as including a single instance of TX processing circuitry 215 and a single instance of RX processing circuitry 220, the gNB 102 could include multiple instances of each (such as one per RF transceiver). Also, various components in FIG. 2 could be combined, further subdivided, or omitted and additional components could be added according to particular needs.

FIG. 3 illustrates an example UE 116 according to embodiments of the present disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of this disclosure to any particular implementation of a UE.

As shown in FIG. 3, the UE 116 includes an antenna 305, a radio frequency (RF) transceiver 310, TX processing circuitry 315, a microphone 320, and receive (RX) processing circuitry 325. The UE 116 also includes a speaker 330, a processor 340, an input/output (I/O) interface (IF) 345, a touchscreen 350, a display 355, and a memory 360. The memory 360 includes an operating system (OS) 361 and one or more applications 362.

The RF transceiver 310 receives, from the antenna 305, an incoming RF signal transmitted by a gNB of the network 100. The RF transceiver 310 down-converts the incoming RF signal to generate an intermediate frequency (IF) or baseband signal. The IF or baseband signal is sent to the RX processing circuitry 325, which generates a processed baseband signal by filtering, decoding, and/or digitizing the baseband or IF signal. The RX processing circuitry 325 transmits the processed baseband signal to the speaker 330 (such as for voice data) or to the processor 340 for further processing (such as for web browsing data).

The TX processing circuitry 315 receives analog or digital voice data from the microphone 320 or other outgoing baseband data (such as web data, e-mail, or interactive video game data) from the processor 340. The TX processing circuitry 315 encodes, multiplexes, and/or digitizes the outgoing baseband data to generate a processed baseband or IF signal. The RF transceiver 310 receives the outgoing processed baseband or IF signal from the TX processing circuitry 315 and up-converts the baseband or IF signal to an RF signal that is transmitted via the antenna 305.

The processor 340 can include one or more processors or other processing devices and execute the OS 361 stored in the memory 360 in order to control the overall operation of the UE 116. For example, the processor 340 could control the reception of forward channel signals and the transmission of reverse channel signals by the RF transceiver 310, the RX processing circuitry 325, and the TX processing circuitry 315 in accordance with well-known principles. In some embodiments, the processor 340 includes at least one microprocessor or microcontroller.

The processor 340 is also capable of executing other processes and programs resident in the memory 360, such as processes for receiving configuration information including information on a beam indication indicating N uplink (UL) transmit beams, where N>1; receiving the beam indication; determining whether an event is detected; selecting a beam from the N UL transmit beams based on whether the event is detected or not; and transmitting an UL transmission using the selected beam, wherein the beam refers to a spatial property used to receive or transmit a source reference signal (RS). The processor 340 can move data into or out of the memory 360 as required by an executing process. In some embodiments, the processor 340 is configured to execute the applications 362 based on the OS 361 or in response to signals received from gNBs or an operator. The processor 340 is also coupled to the I/O interface 345, which provides the UE 116 with the ability to connect to other devices, such as laptop computers and handheld computers. The I/O interface 345 is the communication path between these accessories and the processor 340.

The processor 340 is also coupled to the touchscreen 350 and the display 355. The operator of the UE 116 can use the touchscreen 350 to enter data into the UE 116. The display 355 may be a liquid crystal display, light emitting diode display, or other display capable of rendering text and/or at least limited graphics, such as from web sites.

The memory 360 is coupled to the processor 340. Part of the memory 360 could include a random access memory (RAM), and another part of the memory 360 could include a Flash memory or other read-only memory (ROM).

Although FIG. 3 illustrates one example of UE 116, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs). Also, while FIG. 3 illustrates the UE 116 configured as a mobile telephone or smartphone, UEs could be configured to operate as other types of mobile or stationary devices.

Figure 4A:
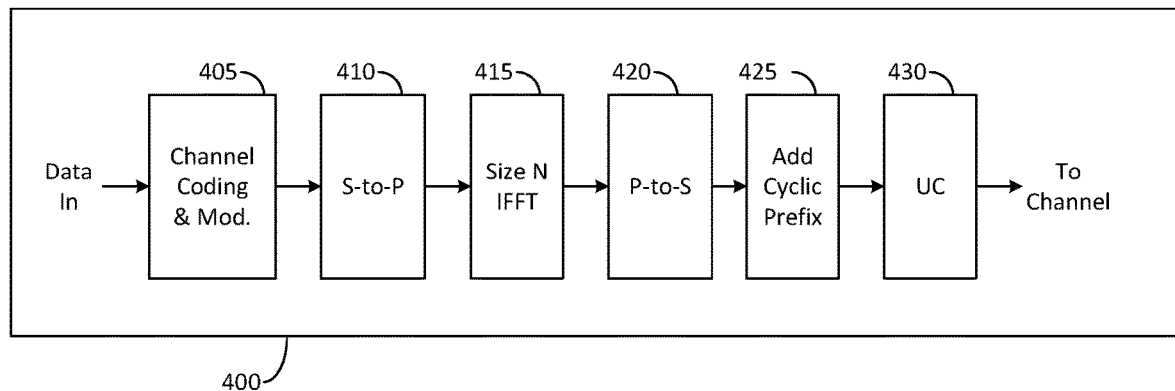
FIG. 4A illustrates a high-level diagram of an orthogonal frequency division multiple access transmit path according to embodiments of the present disclosure.
Figure 4B:
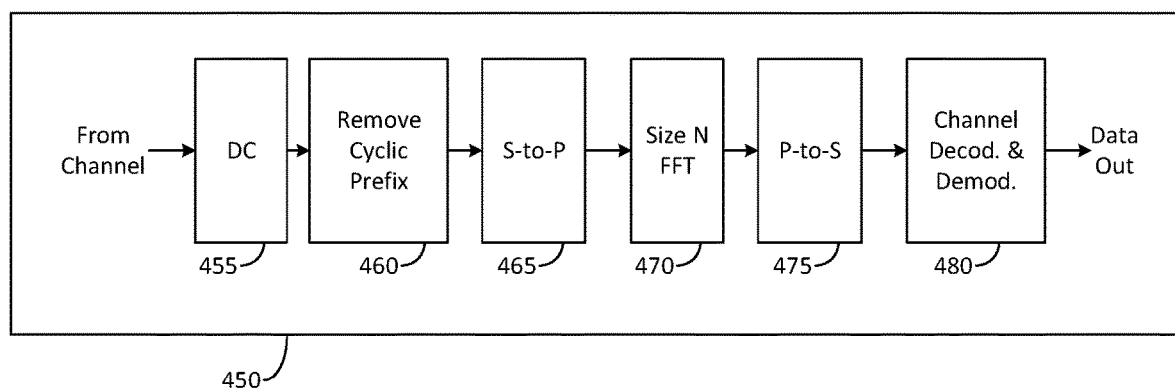
FIG. 4B illustrates a high-level diagram of an orthogonal frequency division multiple access receive path according to embodiments of the present disclosure.

FIG. 4A is a high-level diagram of transmit path circuitry. For example, the transmit path circuitry may be used for an orthogonal frequency division multiple access (OFDMA) communication. FIG. 4B is a high-level diagram of receive path circuitry. For example, the receive path circuitry may be used for an orthogonal frequency division multiple access (OFDMA) communication. In FIGS. 4A and 4B, for downlink communication, the transmit path circuitry may be implemented in a base station (gNB) 102 or a relay station, and the receive path circuitry may be implemented in a user equipment (e.g., user equipment 116 of FIG. 1). In other examples, for uplink communication, the receive path circuitry 450 may be implemented in a base station (e.g., gNB 102 of FIG. 1) or a relay station, and the transmit path circuitry may be implemented in a user equipment (e.g., user equipment 116 of FIG. 1).

Transmit path circuitry comprises channel coding and modulation block 405, serial-to-parallel (S-to-P) block 410, Size N Inverse Fast Fourier Transform (IFFT) block 415, parallel-to-serial (P-to-S) block 420, add cyclic prefix block 425, and up-converter (UC) 430. Receive path circuitry 450 comprises down-converter (DC) 455, remove cyclic prefix block 460, serial-to-parallel (S-to-P) block 465, Size N Fast Fourier Transform (FFT) block 470, parallel-to-serial (P-to-S) block 475, and channel decoding and demodulation block 480.

At least some of the components in FIGS. 4A 400 and 4B 450 may be implemented in software, while other components may be implemented by configurable hardware or a mixture of software and configurable hardware. In particular, it is noted that the FFT blocks and the IFFT blocks described in this disclosure document may be implemented as configurable software algorithms, where the value of Size N may be modified according to the implementation.

Furthermore, although this disclosure is directed to an embodiment that implements the Fast Fourier Transform and the Inverse Fast Fourier Transform, this is by way of illustration only and may not be construed to limit the scope of the disclosure. It may be appreciated that in an alternate embodiment of the present disclosure, the Fast Fourier Transform functions and the Inverse Fast Fourier Transform functions may easily be replaced by discrete Fourier transform (DFT) functions and inverse discrete Fourier transform (IDFT) functions, respectively. It may be appreciated that for DFT and IDFT functions, the value of the N variable may be any integer number (i.e., 1, 4, 3, 4, etc.), while for FFT and IFFT functions, the value of the N variable may be any integer number that is a power of two (i.e., 1, 2, 4, 8, 16, etc.).

In transmit path circuitry 400, channel coding and modulation block 405 receives a set of information bits, applies coding (e.g., LDPC coding) and modulates (e.g., quadrature phase shift keying (QPSK) or quadrature amplitude modulation (QAM)) the input bits to produce a sequence of frequency-domain modulation symbols. Serial-to-parallel block 410 converts (i.e., de-multiplexes) the serial modulated symbols to parallel data to produce N parallel symbol streams where N is the IFFT/FFT size used in BS 102 and UE 116. Size N IFFT block 415 then performs an IFFT operation on the N parallel symbol streams to produce time-domain output signals. Parallel-to-serial block 420 converts (i.e., multiplexes) the parallel time-domain output symbols from Size N IFFT block 415 to produce a serial time-domain signal. Add cyclic prefix block 425 then inserts a cyclic prefix to the time-domain signal. Finally, up-converter 430 modulates (i.e., up-converts) the output of add cyclic prefix block 425 to RF frequency for transmission via a wireless channel. The signal may also be filtered at baseband before conversion to RF frequency.

The transmitted RF signal arrives at the UE 116 after passing through the wireless channel, and reverse operations to those at gNB 102 are performed. Down-converter 455 down-converts the received signal to baseband frequency and removes cyclic prefix block 460 and removes the cyclic prefix to produce the serial time-domain baseband signal. Serial-to-parallel block 465 converts the time-domain baseband signal to parallel time-domain signals. Size N FFT block 470 then performs an FFT algorithm to produce N parallel frequency-domain signals. Parallel-to-serial block 475 converts the parallel frequency-domain signals to a sequence of modulated data symbols. Channel decoding and demodulation block 480 demodulates and then decodes the modulated symbols to recover the original input data stream.

Each of gNBs 101-103 may implement a transmit path that is analogous to transmitting in the downlink to user equipment 111-116 and may implement a receive path that is analogous to receiving in the uplink from user equipment 111-116. Similarly, each one of user equipment 111-116 may implement a transmit path corresponding to the architecture for transmitting in the uplink to gNBs 101-103 and may implement a receive path corresponding to the architecture for receiving in the downlink from gNBs 101-103.

A communication system includes a downlink (DL) that conveys signals from transmission points such as base stations (BSs) or NodeBs to user equipments (UEs) and an Uplink (UL) that conveys signals from UEs to reception points such as NodeBs. A UE, also commonly referred to as a terminal or a mobile station, may be fixed or mobile and may be a cellular phone, a personal computer device, or an automated device. An eNodeB, which is generally a fixed station, may also be referred to as an access point or other equivalent terminology. For LTE systems, a NodeB is often referred as an eNodeB.

In a communication system, such as LTE system, DL signals can include data signals conveying information content, control signals conveying DL control information (DCI), and reference signals (RS) that are also known as pilot signals. An eNodeB transmits data information through a physical DL shared channel (PDSCH). An eNodeB transmits DCI through a physical DL control channel (PDCCH) or an Enhanced PDCCH (EPDCCH).

An eNodeB transmits acknowledgement information in response to data transport block (TB) transmission from a UE in a physical hybrid ARQ indicator channel (PHICH). An eNodeB transmits one or more of multiple types of RS including a UE-common RS (CRS), a channel state information RS (CSI-RS), or a demodulation RS (DMRS). A CRS is transmitted over a DL system bandwidth (BW) and can be used by UEs to obtain a channel estimate to demodulate data or control information or to perform measurements. To reduce CRS overhead, an eNodeB may transmit a CSI-RS with a smaller density in the time and/or frequency domain than a CRS. DMRS can be transmitted only in the BW of a respective PDSCH or EPDCCH and a UE can use the DMRS to demodulate data or control information in a PDSCH or an EPDCCH, respectively. A transmission time interval for DL channels is referred to as a subframe and can have, for example, duration of 1 millisecond.

DL signals also include transmission of a logical channel that carries system control information. A BCCH is mapped to either a transport channel referred to as a broadcast channel (BCH) when the DL signals convey a master information block (MIB) or to a DL shared channel (DL-SCH) when the DL signals convey a System Information Block (SIB). Most system information is included in different SIBs that are transmitted using DL-SCH. A presence of system information on a DL-SCH in a subframe can be indicated by a transmission of a corresponding PDCCH conveying a codeword with a cyclic redundancy check (CRC) scrambled with system information RNTI (SI-RNTI). Alternatively, scheduling information for a SIB transmission can be provided in an earlier SIB and scheduling information for the first SIB (SIB-1) can be provided by the MIB.

DL resource allocation is performed in a unit of subframe and a group of physical resource blocks (PRBs). A transmission BW includes frequency resource units referred to as resource blocks (RBs). Each RB includes $N_{EPDCCH}$ sub-carriers, or resource elements (REs), such as 12 REs. A unit of one RB over one subframe is referred to as a PRB. A UE can be allocated $n_s = (n_{s0} + y \cdot N_{EPDCCH})$ mod D RBs for a total of $Z = O_F + \lfloor n_{s0} + y \cdot N_{EPDCCH})/D \rfloor$ REs for the PDSCH transmission BW.

UL signals can include data signals conveying data information, control signals conveying UL control information (UCI), and UL RS. UL RS includes DMRS and Sounding RS (SRS). A UE transmits DMRS only in a BW of a respective PUSCH or PUCCH. An eNodeB can use a DMRS to demodulate data signals or UCI signals. A UE transmits SRS to provide an eNodeB with an UL CSI. A UE transmits data information or UCI through a respective physical UL shared channel (PUSCH) or a Physical UL control channel (PUCCH). If a UE needs to transmit data information and UCI in a same UL subframe, the UE may multiplex both in a PUSCH. UCI includes Hybrid Automatic Repeat request acknowledgement (HARQ-ACK) information, indicating correct (ACK) or incorrect (NACK) detection for a data TB in a PDSCH or absence of a PDCCH detection (DTX), scheduling request (SR) indicating whether a UE has data in the UE's buffer, rank indicator (RI), and channel state information (CSI) enabling an eNodeB to perform link adaptation for PDSCH transmissions to a UE. HARQ-ACK information is also transmitted by a UE in response to a detection of a PDCCH/EPDCCH indicating a release of semi-persistently scheduled PDSCH.

An UL subframe includes two slots. Each slot includes $N_{symb}^{UL}$ symbols for transmitting data information, UCI, DMRS, or SRS. A frequency resource unit of an UL system BW is a RB. A UE is allocated $N_{RB}$ RBs for a total of $N_{RB} \cdot N_{SC}^{RB}$ REs for a transmission BW. For a PUCCH, $N_{RB}=1$. A last subframe symbol can be used to multiplex SRS transmissions from one or more UEs. A number of subframe symbols that are available for data/UCI/DMRS transmission is $N_{symb}=2 \cdot (N_{symb}^{UL}-1)-N_{SRS}$, where $N_{SRS}=1$ if a last subframe symbol is used to transmit SRS and $N_{SRS}=0$ otherwise.

Figure 5:
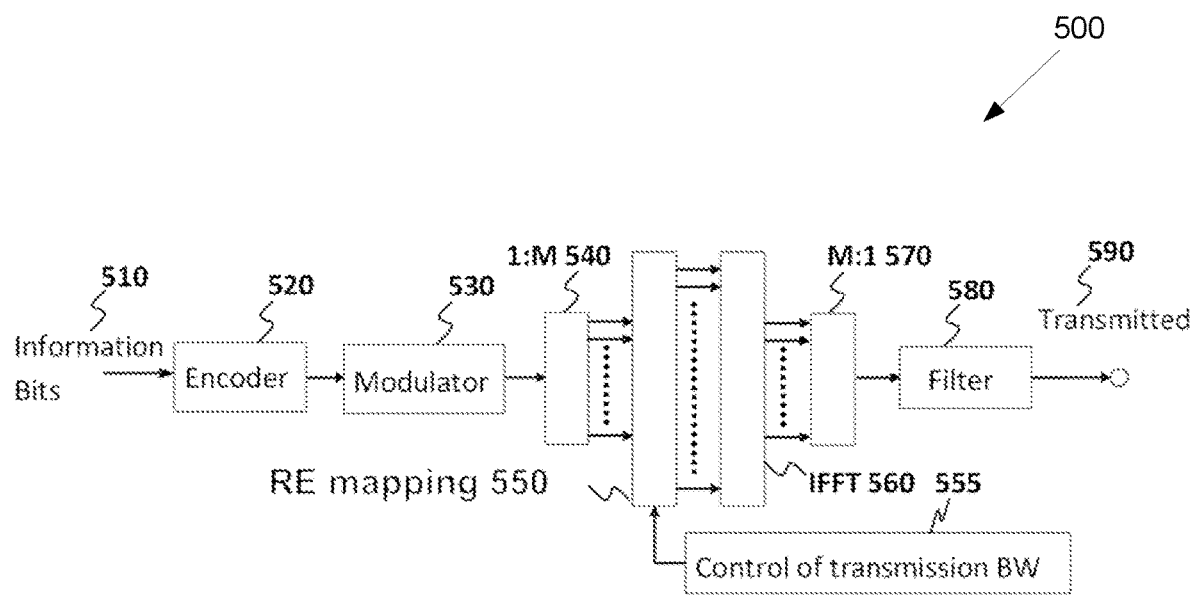
FIG. 5 illustrates a transmitter block diagram for a PDSCH in a subframe according to embodiments of the present disclosure.

FIG. 5 illustrates a transmitter block diagram 500 for a PDSCH in a subframe according to embodiments of the present disclosure. The embodiment of the transmitter block diagram 500 illustrated in FIG. 5 is for illustration only. One or more of the components illustrated in FIG. 5 can be implemented in specialized circuitry configured to perform the noted functions or one or more of the components can be implemented by one or more processors executing instructions to perform the noted functions. FIG. 5 does not limit the scope of this disclosure to any particular implementation of the transmitter block diagram 500.

As shown in FIG. 5, information bits 510 are encoded by encoder 520, such as a turbo encoder, and modulated by modulator 530, for example using quadrature phase shift keying (QPSK) modulation. A serial to parallel (S/P) converter 540 generates M modulation symbols that are subsequently provided to a mapper 550 to be mapped to REs selected by a transmission BW selection unit 555 for an assigned PDSCH transmission BW, unit 560 applies an Inverse fast Fourier transform (IFFT), the output is then serialized by a parallel to serial (P/S) converter 570 to create a time domain signal, filtering is applied by filter 580, and a signal transmitted 590. Additional functionalities, such as data scrambling, cyclic prefix insertion, time windowing, interleaving, and others are well known in the art and are not shown for brevity.

Figure 6:
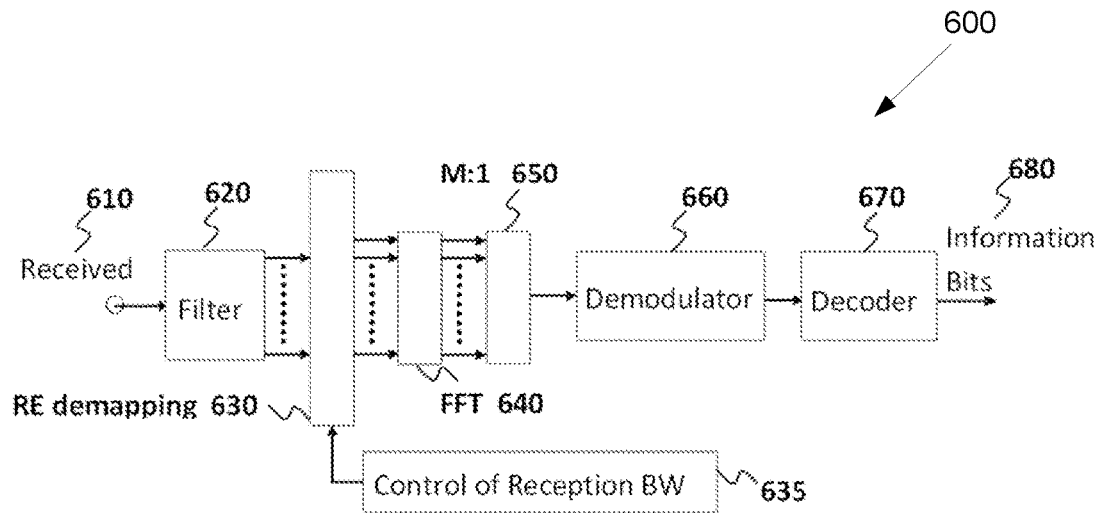
FIG. 6 illustrates a receiver block diagram for a PDSCH in a subframe according to embodiments of the present disclosure.

FIG. 6 illustrates a receiver block diagram 600 for a PDSCH in a subframe according to embodiments of the present disclosure. The embodiment of the diagram 600 illustrated in FIG. 6 is for illustration only. One or more of the components illustrated in FIG. 6 can be implemented in specialized circuitry configured to perform the noted functions or one or more of the components can be implemented by one or more processors executing instructions to perform the noted functions. FIG. 6 does not limit the scope of this disclosure to any particular implementation of the diagram 600.

As shown in FIG. 6, a received signal 610 is filtered by filter 620, REs 630 for an assigned reception BW are selected by BW selector 635, unit 640 applies a fast Fourier transform (FFT), and an output is serialized by a parallel-to-serial converter 650. Subsequently, a demodulator 660 coherently demodulates data symbols by applying a channel estimate obtained from a DMRS or a CRS (not shown), and a decoder 670, such as a turbo decoder, decodes the demodulated data to provide an estimate of the information data bits 680. Additional functionalities such as time-windowing, cyclic prefix removal, de-scrambling, channel estimation, and de-interleaving are not shown for brevity.

Figure 7:
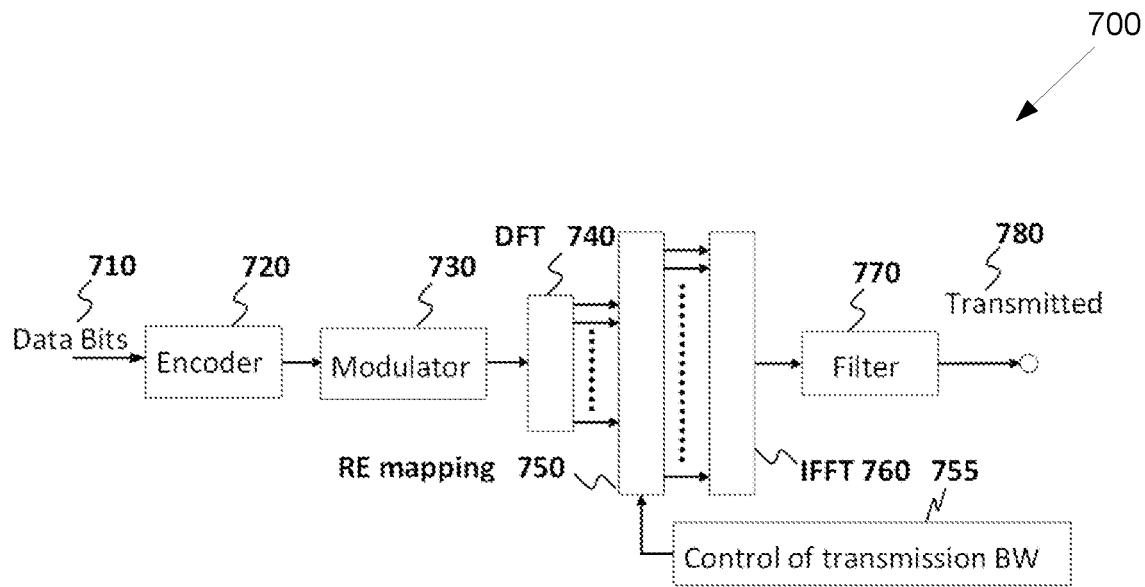
FIG. 7 illustrates a transmitter block diagram for a PUSCH in a subframe according to embodiments of the present disclosure.

FIG. 7 illustrates a transmitter block diagram 700 for a PUSCH in a subframe according to embodiments of the present disclosure. The embodiment of the block diagram 700 illustrated in FIG. 7 is for illustration only. One or more of the components illustrated in FIG. 5 can be implemented in specialized circuitry configured to perform the noted functions or one or more of the components can be implemented by one or more processors executing instructions to perform the noted functions. FIG. 7 does not limit the scope of this disclosure to any particular implementation of the block diagram 700.

As shown in FIG. 7, information data bits 710 are encoded by encoder 720, such as a turbo encoder, and modulated by modulator 730. A discrete Fourier transform (DFT) unit 740 applies a DFT on the modulated data bits, REs 750 corresponding to an assigned PUSCH transmission BW are selected by transmission BW selection unit 755, unit 760 applies an IFFT and, after a cyclic prefix insertion (not shown), filtering is applied by filter 770 and a signal transmitted 780.

Figure 8:
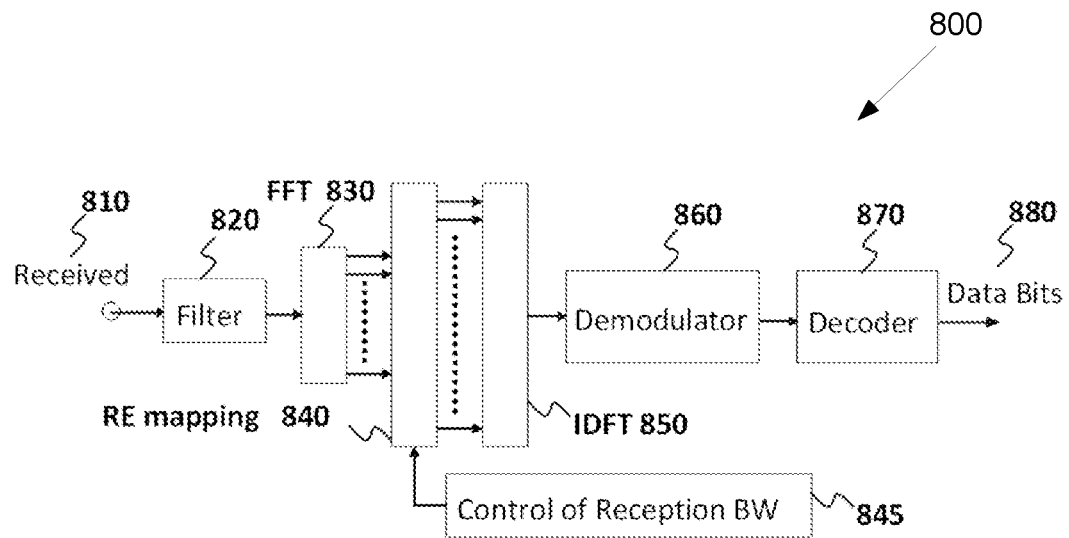
FIG. 8 illustrates a receiver block diagram for a PUSCH in a subframe according to embodiments of the present disclosure.

FIG. 8 illustrates a receiver block diagram 800 for a PUSCH in a subframe according to embodiments of the present disclosure. The embodiment of the block diagram 800 illustrated in FIG. 8 is for illustration only. One or more of the components illustrated in FIG. 8 can be implemented in specialized circuitry configured to perform the noted functions or one or more of the components can be implemented by one or more processors executing instructions to perform the noted functions. FIG. 8 does not limit the scope of this disclosure to any particular implementation of the block diagram 800.

As shown in FIG. 8, a received signal 810 is filtered by filter 820. Subsequently, after a cyclic prefix is removed (not shown), unit 830 applies a FFT, REs 840 corresponding to an assigned PUSCH reception BW are selected by a reception BW selector 845, unit 850 applies an inverse DFT (IDFT), a demodulator 860 coherently demodulates data symbols by applying a channel estimate obtained from a DMRS (not shown), a decoder 870, such as a turbo decoder, decodes the demodulated data to provide an estimate of the information data bits 880.

Figure 9:
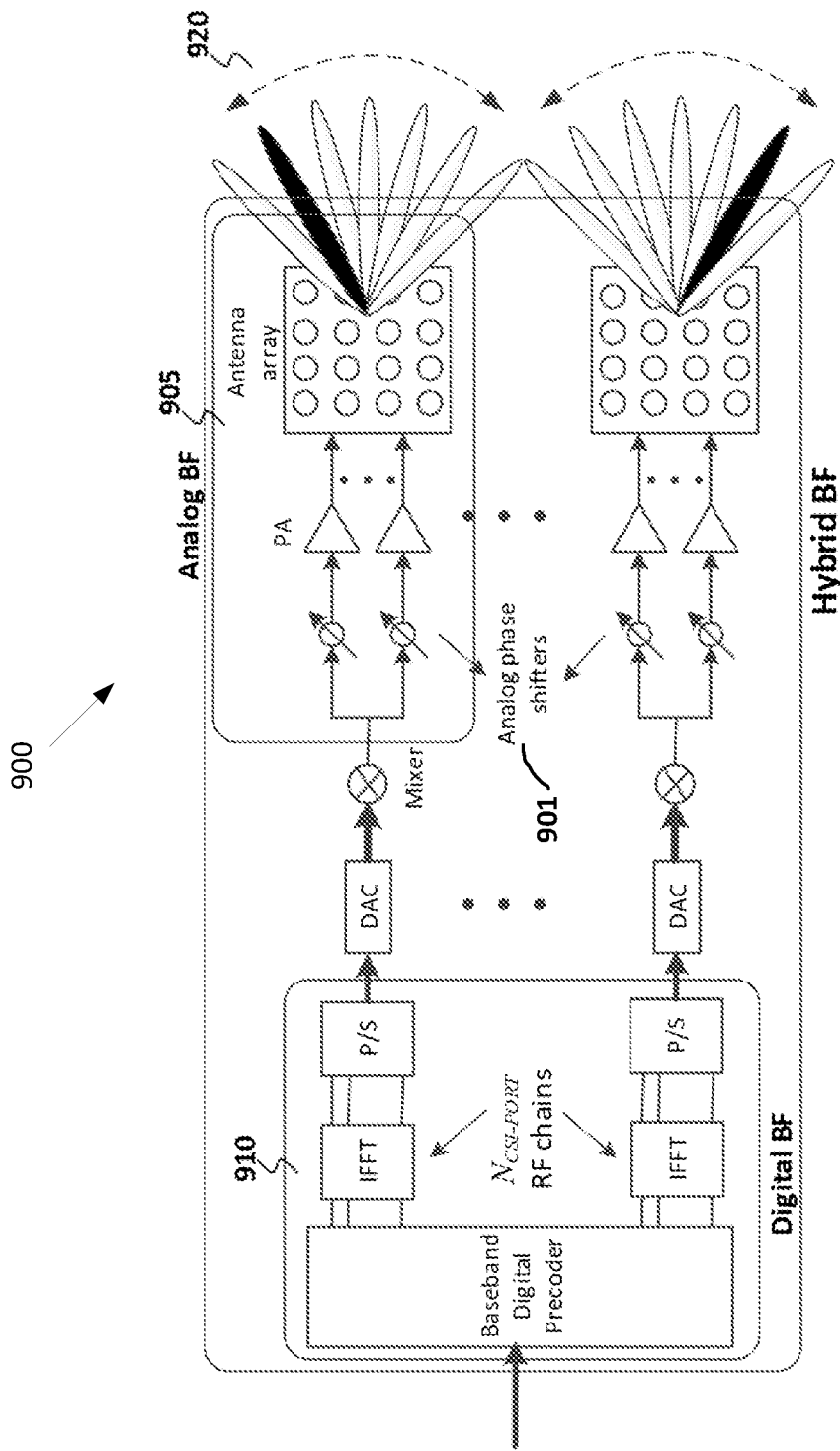
FIG. 9 illustrates an example multiplexing of two slices according to embodiments of the present disclosure.

FIG. 9 illustrates an example of beams 900 according to embodiments of the present disclosure. The embodiment of the beams 900 illustrated in FIG. 9 is for illustration only. One or more of the components illustrated in FIG. 9 can be implemented in specialized circuitry configured to perform the noted functions or one or more of the components can be implemented by one or more processors executing instructions to perform the noted functions. FIG. 9 does not limit the scope of this disclosure to any particular implementation of the beams 900.

The 3GPP NR specification supports up to 32 CSI-RS antenna ports which enable an eNB to be equipped with a large number of antenna elements (such as 64 or 128). In this case, a plurality of antenna elements is mapped onto one CSI-RS port. For mmWave bands, although the number of antenna elements can be larger for a given form factor, the number of CSI-RS ports—which can correspond to the number of digitally precoded ports—tends to be limited due to hardware constraints (such as the feasibility to install a large number of ADCs/DACs at mmWave frequencies) as illustrated in FIG. 9. In this case, one CSI-RS port is mapped onto a large number of antenna elements which can be controlled by a bank of analog phase shifters 901. One CSI-RS port can then correspond to one sub-array which produces a narrow analog beam through analog beamforming 905. This analog beam can be configured to sweep across a wider range of angles (920) by varying the phase shifter bank across symbols or subframes. The number of sub-arrays (equal to the number of RF chains) is the same as the number of CSI-RS ports $N_{CSI-PORT}$. A digital beamforming unit 910 performs a linear combination across $N_{CSI-PORT}$ analog beams to further increase precoding gain. While analog beams are wideband (hence not frequency-selective), digital precoding can be varied across frequency sub-bands or resource blocks. Receiver operation can be conceived analogously.

Since the above system utilizes multiple analog beams for transmission and reception (wherein one or a small number of analog beams are selected out of a large number, for instance, after a training duration—to be performed from time to time), the term "multi-beam operation" is used to refer to the overall system aspect. This includes, for the purpose of illustration, indicating the assigned DL or UL transmit (TX) beam (also termed "beam indication"), measuring at least one reference signal for calculating and performing beam reporting (also termed "beam measurement" and "beam reporting", respectively), and receiving a DL or UL transmission via a selection of a corresponding receive (RX) beam.

The above system is also applicable to higher frequency bands such as >52.6 GHz (also termed the FR4). In this case, the system can employ only analog beams. Due to the O2 absorption loss around 60 GHz frequency (~10 dB additional loss @ 100 m distance), larger number of and sharper analog beams (hence larger number of radiators in the array) will be needed to compensate for the additional path loss.

In the 3GPP NR specification, multi-beam operation is designed primarily for single transmit-receive point (TRP) and single antenna panel. Therefore, the specification supports beam indication for one TX beam wherein a TX beam is associated with a reference RS. For DL beam indication and measurement, the reference RS can be NZP (non-zero power) CSI-RS and/or SSB (synchronization signal block, which includes primary synchronization signal, secondary synchronization signal, and PBCH). Here, DL beam indication is done via the transmission configuration indicator (TCI) field in DL-related DCI which includes an index to one (and only one) assigned reference RS. A set of hypotheses or the so-called TCI states is configured via higher-layer (RRC) signaling and, when applicable, a subset of those TCI states is selected/activated via MAC CE for the TCI field code points. For UL beam indication and measurement, the reference RS can be NZP CSI-RS, SSB, and/or SRS. Here, UL beam indication is done via the SRS resource indicator (SRI) field in UL-related DCI which is linked to one (and only one) reference RS. This linkage is configured via higher-layer signaling using the SpatialRelationInfo RRC parameter. Essentially, only one TX beam is indicated to the UE.

In the 3GPP NR specification, beam management was designed to share the same framework as CSI acquisition. This, however, compromises the performance of beam management especially for FR2. This is because beam management operates mainly with analog beams (characteristic of FR2) which paradigmatically differ from CSI acquisition (designed with FR1 in mind). Consequently, the 3GPP NR specification beam management becomes cumbersome and is unlikely able to keep up with more aggressive use cases which require large number of beams and fast beam switching (e.g., higher frequency bands, high mobility, and/or larger number of narrower analog beams). In addition, the 3GPP NR specification was designed to accommodate a number of unknown or rudimentary capabilities (e.g., UEs not capable of beam correspondence). To be flexible, it results in a number of options. This becomes burdensome to L1 control signaling and therefore a number of reconfigurations are performed via RRC signaling (higher-layer configuration). While this avoids L1 control overhead, it either results in high latency (if reconfiguration is performed sparsely) or imposes high usage of PDSCH (since RRC signaling consumes PDSCH resources).

In one example, when beam correspondence is utilized, UL beam selection can be performed via measuring DL RS (CSI-RS and/or SSB) and CRI reporting accompanied with corresponding beam metrics (e.g., RSRP, SINR). That is, based on the CRI/RSRP or CRI/SINR reporting from the UE, the network (NW) can assume that the UE performs UL transmission on PUSCH with the UL TX beam associated with one of the latest CRI reports (especially the one with the highest RSRP or/SINR). Likewise, the UE can assume that the NW knows about this UE selection. Therefore, there is no need for a separate UL beam indication (e.g., via the SRI field or the UL-TCI field in the respective UL grant).

In the 3GPP NR specification, when beam correspondence is not utilized, UL beam selection can be performed via the NW selecting the UL TX beam and indicating it to the UE via the UL grant (signaled via SRI field or UL-TCI field—essentially indicating the UL TCI state associated with the UL TX beam). This selection is enabled by measuring the SRS transmitted from the UE (configured by the NW).

In either case, when an event that results in the UE having to select an (alternate) UL TX beam different from what the NW expects, some additional mechanisms are needed to ensure that (a) the UE has the alternate UL TX beam available when the UE detects such an event and the next UL TX beam indication can only in a later time slot, and (b) the NW is aware of the UE decision. A few examples of such an event are as follows.

In one example, such an event can happen due to the so-called Maximum Permissible Exposure (MPE) regulation, especially in North America, that restricts the UE transmission power in certain directions. That is, to prevent any excessive electromagnetic wave exposure on delicate soft tissues (e.g., brain tissues), the UE is to avoid transmitting high energy signal along some directions (e.g., toward the head). Unfortunately, such directions may correspond to the "best" UL TX beams (e.g., associated with the CRI of the highest reported RSRP/SINR, or associated with the SRS resource yielding the best measured SINR at the NW). When the "best" UL TX beams are not used for UL transmission, some loss of UL throughput (especially coverage) will occur.

In another example, such an event can happen due to hardware (HW) limitation at a UE equipped with multiple antenna panels, and in response to the event, the UE needs to select/switch antenna panel for UL transmission.

In yet another example, such an event can happen due to potential beam failure, and to avoid beam failure, the UE needs to select/switch antenna panel for UL transmission.

In yet another example, such an event can happen due to a sudden change in channel conditions (e.g., due to high speed, antenna/panel blockage, etc.) which may result in beam failure, and the UE needs to switch/change TX beam in order to continue UL transmission without interruptions/failures or having to wait for the next UL TX beam update/indication.

Therefore, there is a need for efficient designs for enabling "alternate" UL TX beam selection (without having to wait for the next UL TX beam indication) in order to avoid outage (or beam failure), loss in UL throughput, loss in UL coverage, and issues related to HW, that may happen due to the events mentioned above. In this disclosure, several example embodiments are proposed for such designs.

In the present disclosure, the term "activation" describes an operation wherein a UE receives and decodes a signal from the network (or gNB) that signifies a starting point in time. The starting point can be a present or a future slot/subframe or symbol—the exact location either implicitly or explicitly indicated, or otherwise fixed or higher-layer configured. Upon successfully decoding the signal, the UE responds accordingly. The term "deactivation" describes an operation wherein a UE receives and decodes a signal from the network (or gNB) that signifies a stopping point in time. The stopping point can be a present or a future slot/subframe or symbol—the exact location either implicitly or explicitly indicated, or otherwise fixed or higher-layer configured. Upon successfully decoding the signal, the UE responds accordingly.

Terminology such as TCI, TCI states, SpatialRelationInfo, target RS, reference RS, and other terms is used for illustrative purposes and therefore not normative. Other terms that refer to the same functions can also be used.

A "reference RS" corresponds to a set of characteristics of DL or UL TX beam, such as direction, precoding/beamforming, number of ports, etc. For instance, as the UE receives a reference RS index/ID in a DL assignment represented by a TCI state, the UE applies the known characteristics of the reference RS to the assigned DL transmission. In an alternative, the reference RS included in a TCI state is referred to as a source RS (e.g., to distinguish an RS included in a TCI state from an RS configured for beam measurement/reporting). The reference RS can be received and measured by the UE (in this case, the reference RS is a downlink signal such as NZP CSI-RS and/or SSB) with the result of the measurement used for calculating a beam report (in the 3GPP NR specification, at least one L1-RSRP accompanied by at least one CRI). As the NW/gNB receives the beam report, the NW can be better equipped with information to assign a particular DL TX beam to the UE. Optionally, the reference RS can be transmitted by the UE (in this case, the reference RS is a downlink signal such as SRS). As the NW/gNB receives the reference RS, the NW/gNB can measure and calculate the needed information to assign a particular DL TX beam to the UE. This option is applicable when DL-UL beam pair correspondence holds.

The reference RS can be dynamically triggered by the NW/gNB (e.g., via DCI in case of aperiodic RS), preconfigured with a certain time-domain behavior (such as periodicity and offset, in case of periodic RS), or a combination of such pre-configuration and activation/deactivation (in case of semi-persistent RS).

There are two types of frequency range (FR) defined in 3GPP NR specifications. The sub-6 GHz range is called frequency range 1 (FR1) and millimeter wave range is called frequency range 2 (FR2). An example of the frequency range for FR1 and FR2 is shown below.

| Frequency range designation | Corresponding frequency range |
|---|---|
| FR1 | 450 MHz-600 MHz |
| FR2 | 24250 MHz-52600 MHz |

The following embodiment is an example of DL multi-beam operation that utilizes DL beam indication after the network (NW) receives some transmission from the UE. In the first example embodiment, aperiodic CSI-RS is transmitted by the NW and measured by the UE. Although aperiodic RS is used in these two examples, periodic or semi-persistent RS can also be used.

For mmWave (or FR2) or higher frequency bands (such as >52.6 GHz or FR4) where multi-beam operation is especially relevant, transmission-reception process includes the receiver to select a receive (RX) beam for a given TX beam. For UL multi-beam operation, the gNB selects an UL RX beam for every UL TX beam (which corresponds to a reference RS). Therefore, when UL RS (such as SRS and/or DMRS) is used as reference RS, the NW/gNB triggers or configures the UE to transmit the UL RS (which is associated with a selection of UL TX beam). The gNB, upon receiving and measuring the UL RS, selects an UL RX beam. As a result, a TX-RX beam pair is derived. The NW/gNB can perform this operation for all the configured reference RSs (either per reference RS or "beam sweeping") and determine all the TX-RX beam pairs associated with all the reference RSs configured to the UE. On the other hand, when DL RS (such as CSI-RS and/or SSB) is used as reference RS (pertinent when DL-UL beam correspondence or reciprocity holds), the NW/gNB transmit the RS to the UE (for UL and by reciprocity, this corresponds to an UL RX beam). In response, the UE measures the reference RS (and in the process selects an UL TX beam) and reports the beam metric associated with the quality of the reference RS. In this case, the UE determines the TX-RX beam pair for every configured (DL) reference RS. Therefore, although this knowledge is unavailable to the NW/gNB, the UE—upon receiving a reference RS (hence UL RX beam) indication from the NW/gNB—can select the UL TX beam from the knowledge on all the TX-RX beam pairs.

In the present disclosure, the term "Resource Indicator", also abbreviated as REI, is used to refer to an indicator of RS resource used for signal/channel and/or interference measurement. This term is used for illustrative purposes and hence can be substituted with any other term that refers to the same function. Examples of REI include the aforementioned CSI-RS resource indicator (CRI) and SSB resource indicator (SSB-RI). Any other RS can also be used for signal/channel and/or interference measurement such as DMRS.

Figure 10:
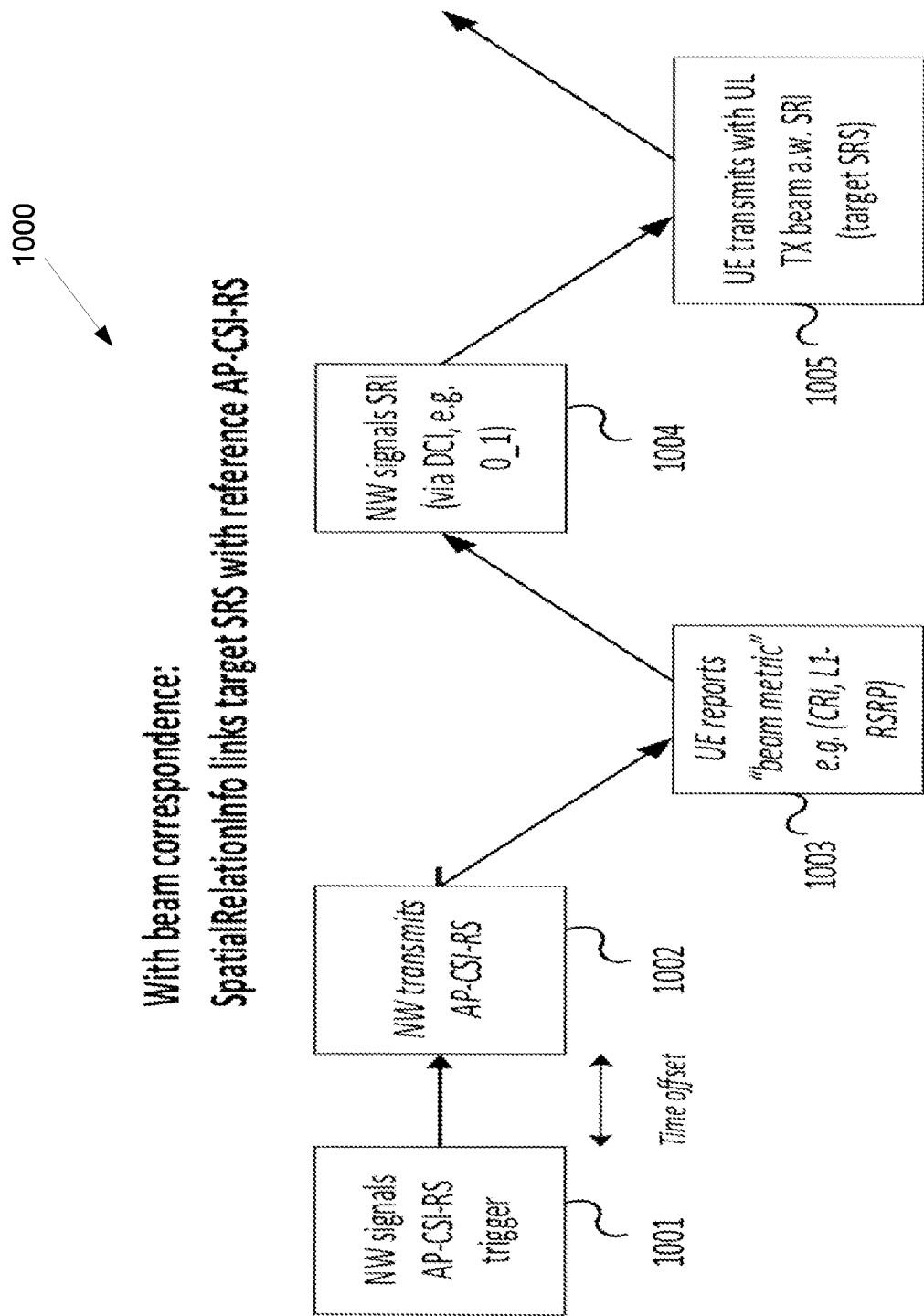
FIG. 10 illustrates an uplink multi-beam operation according to embodiments of the present disclosure.

In one example illustrated in FIG. 10, an UL multi-beam operation 1000 is shown. The embodiment of the UL multi-beam operation 1000 illustrated in FIG. 10 is for illustration only. FIG. 10 does not limit the scope of this disclosure to any particular implementation of the UL multi-beam operation 1000.

The UL multi-beam operation 1000 starts with starts with the gNB/NW signaling to a UE an aperiodic CSI-RS (AP-CSI-RS) trigger or indication (step 1001). This trigger or indication can be included in a DCI (either UL-related or DL-related, either separately or jointly signaled with an aperiodic CSI request/trigger) and indicate transmission of AP-CSI-RS in a same (zero time offset) or later slot/sub-frame (>0 time offset). Upon receiving the AP-CSI-RS transmitted by the gNB/NW (step 1002), the UE measures the AP-CSI-RS and, in turn, calculates and reports a "beam metric" (indicating quality of a particular TX beam hypothesis) (step 1003). Examples of such beam reporting are CSI-RS resource indicator (CRI) or SSB resource indicator (SSB-RI) coupled with its associated L1-RSRP/L1-RSRQ/L1-SINR/CQI. Upon receiving the beam report from the UE, the NW can use the beam report to select an UL TX beam for the UE and indicate the UL TX beam selection (step 1004) using the SRI field in the UL-related DCI (that carries the UL grant, such as DCI format 0_1 in NR). The SRI corresponds to a "target" SRS resource that is linked to a reference RS (in this case, an AP-CSI-RS) via SpatialRelationInfo configuration. Upon successfully decoding the UL-related DCI with the SRI, the UE performs UL transmission (such as data transmission on PUSCH) with the UL TX beam associated with the SRI (step 1005).

Figure 11:
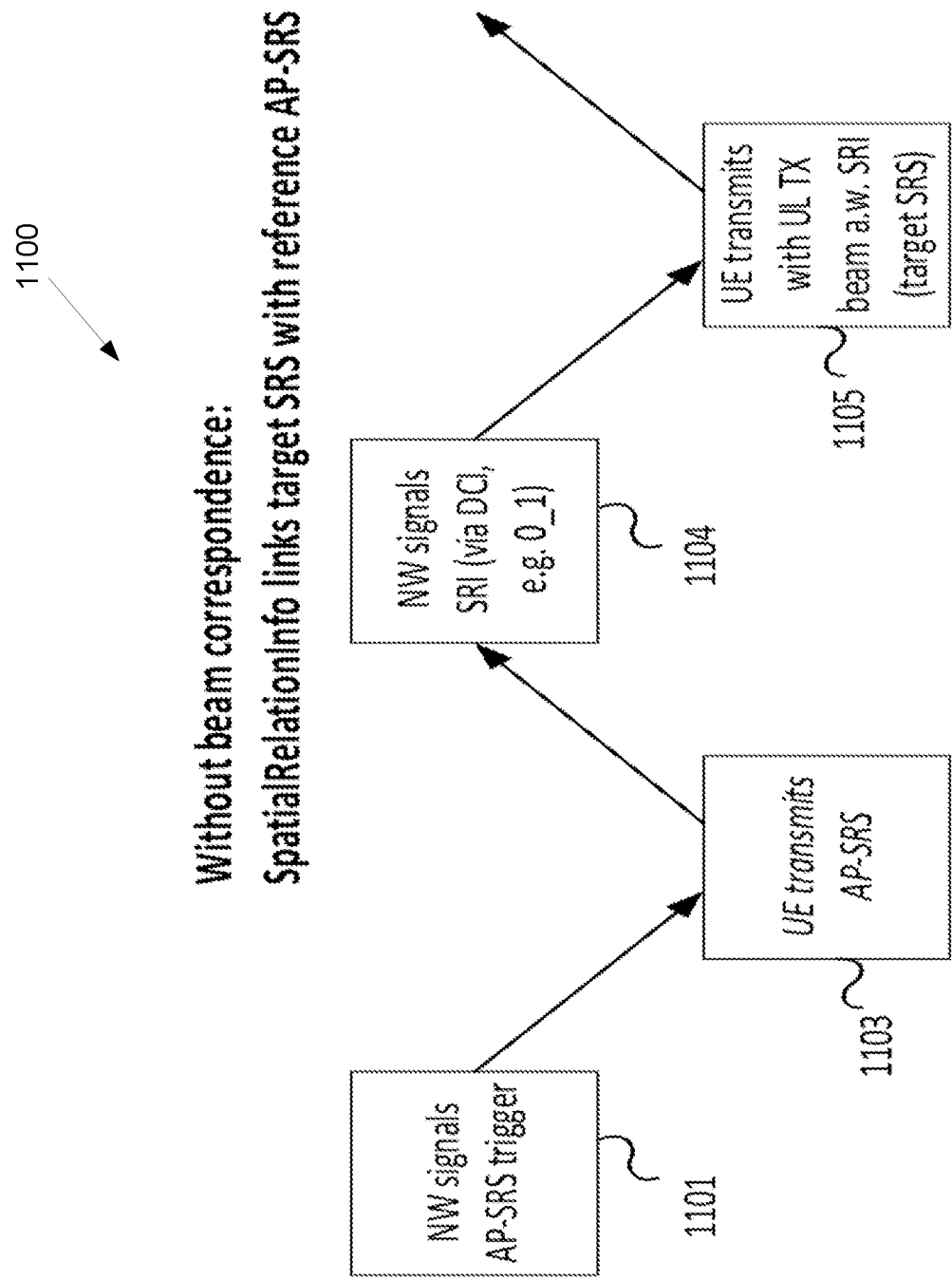
FIG. 11 illustrates an uplink multi-beam operation according to embodiments of the present disclosure.

In another example illustrated in FIG. 11, an UL multi-beam operation 1100 is shown. The embodiment of the UL multi-beam operation 1100 illustrated in FIG. 11 is for illustration only. FIG. 11 does not limit the scope of this disclosure to any particular implementation of the UL multi-beam operation 1100.

The UL multi-beam operation 1100 starts with the gNB/NW signaling to a UE an aperiodic SRS (AP-SRS) trigger or request (step 1101). This trigger can be included in a DCI (either UL-related or DL-related). Upon receiving and decoding the AP-SRS trigger (step 1102), the UE transmits AP-SRS to the gNB/NW (step 1103) so that the NW (or gNB) can measure the UL propagation channel and select an UL TX beam for the UE. The gNB/NW can then indicate the UL TX beam selection (step 1104) using the SRI field in the UL-related DCI (that carries the UL grant, such as DCI format 0_1 in NR). The SRI corresponds to a "target" SRS resource that is linked to a reference RS (in this case, an AP-SRS) via SpatialRelationInfo configuration. Upon successfully decoding the UL-related DCI with the SRI, the UE performs UL transmission (such as data transmission on PUSCH) with the UL TX beam associated with the SRI (step 1105).

Figure 12:
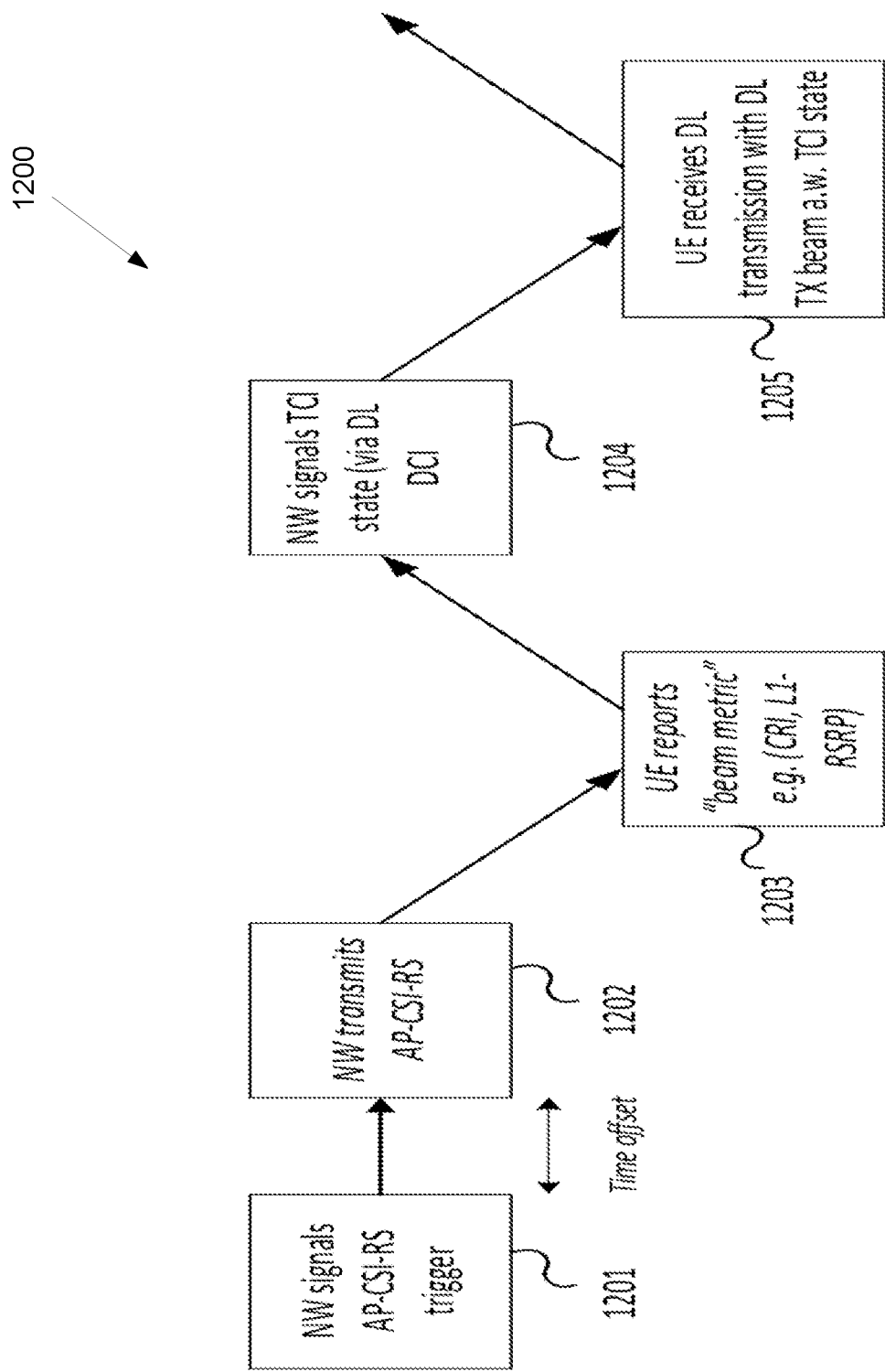
FIG. 12 illustrates a downlink multi-beam operation according to embodiments of the present disclosure.

In another example illustrated in FIG. 12, a DL multi-beam operation 1200 is shown. The embodiment of the DL multi-beam operation 1200 illustrated in FIG. 12 is for illustration only. FIG. 12 does not limit the scope of this disclosure to any particular implementation of the DL multi-beam operation 1200.

In the example illustrated in FIG. 12, where a UE is configured for measuring/receiving aperiodic CSI-RS (AP-CSI-RS) and reporting aperiodic CSI (AP CSI), a DL multi-beam operation 1200 starts with the gNB/NW signaling to a UE an aperiodic CSI-RS (AP-CSI-RS) trigger or indication (step 1201). This trigger or indication can be included in a DCI (either UL-related or DL-related, either separately or jointly signaled with an aperiodic CSI request/trigger) and indicate transmission of AP-CSI-RS in a same (zero time offset) or later slot/sub-frame (>0 time offset).

Upon receiving the AP-CSI-RS transmitted by the gNB/NW (step 1202), the UE measures the AP-CSI-RS and, in turn, calculates and reports a "beam metric" (included in the CSI, indicating quality of a particular TX beam hypothesis) (step 1203). Examples of such beam reporting (supported in the 3GPP NR specification) are CSI-RS resource indicator (CRI) or SSB resource indicator (SSB-RI) coupled with its associated L1-RSRP and/or L1-SINR. Upon receiving the beam report from the UE, the NW/gNB can use the beam report to select a DL TX beam for the UE and indicate the DL TX beam selection (step 1204) using the TCI field in the DL-related DCI (that carries the DL assignment, such as DCI format 1_1 in NR). The TCI state corresponds to a reference RS (in this case, an AP-CSI-RS) defined/configured via the TCI state definition (higher-layer/RRC configured, from which a subset is activated via MAC CE for the DCI-based selection). Upon successfully decoding the DL-related DCI with the TCI field, the UE performs DL reception (such as data transmission on PDSCH) with the DL TX beam associated with the TCI field (step 1205). In this example embodiment, only one DL TX beam is indicated to the UE.

In the above two example embodiments illustrated in FIGS. 10 and 11, only one UL TX beam is indicated to the UE. The SRI used in embodiments illustrated in FIGS. 10 and 11 can also be replaced with UL-TCI wherein an UL-TCI field can be introduced in the pertinent UL-related DCI(s), either in place of or in addition to the SRI field in the 3GPP NR specification.

The aperiodic CSI-RS (along with the associated aperiodic reporting) in the embodiment illustrated in FIG. 10 and the aperiodic SRS in the embodiment illustrated in FIG. 1100 can be substituted with that of another time-domain behavior such as semi-persistent (SP) or periodic (P).

In any of the embodiments or sub-embodiments or examples below, a flowchart is used for illustrative purposes. The present disclosure covers any possible variation of the flowchart as long as at least some of the components are included. Such components include the UL TX beam indication indicating multiple UL TX beams and the event-dependent UL TX beam switch from the indicated multiple UL TX beams.

In the rest of the disclosure, the term "beam", can be associated with a spatial transmission/reception of a resource signal (RS) from a "port", "antenna port", or "virtual antenna/port". Likewise, the term "transmit (TX) beam", can be associated with a spatial transmission of a resource signal (RS) or a channel from a "port", "antenna port", or "virtual antenna/port"; and the term "receive (RX) beam", can be associated with a spatial reception of a resource signal (RS) or a channel from a "port", "antenna port", or "virtual antenna/port". The spatial transmission/reception of a beam can be in a three-dimension (3D) space. In a beam-formed wireless system, the transmission and reception of wireless signal can be via multiple TX and multiple RX beams.

The present disclosure includes the following components for efficient designs for enabling "alternate" UL TX beam selection (without having to wait for the next UL TX beam indication) when an event (such as the ones mentioned above) is detected at the UE.

Component 1—UE Procedures for Event-Based UL TX Beam Switch

In one embodiment (I), a UE is configured to receive UL TX beam indication indicating multiple (N) UL TX beams. The UE is further configured to transmit UL transmission (such as data transmission on PUSCH) with a UL TX beam selected from the multiple UL TX beams. In one example, for a UE with single antenna panel (SP), N>1 UL TX beams are indicated for MPE mitigation. In one example, for a UE with multiple antenna panels (MP), N>1 UL TX beams are indicated for fast panel switch and/or MPE mitigation.

Figure 13:
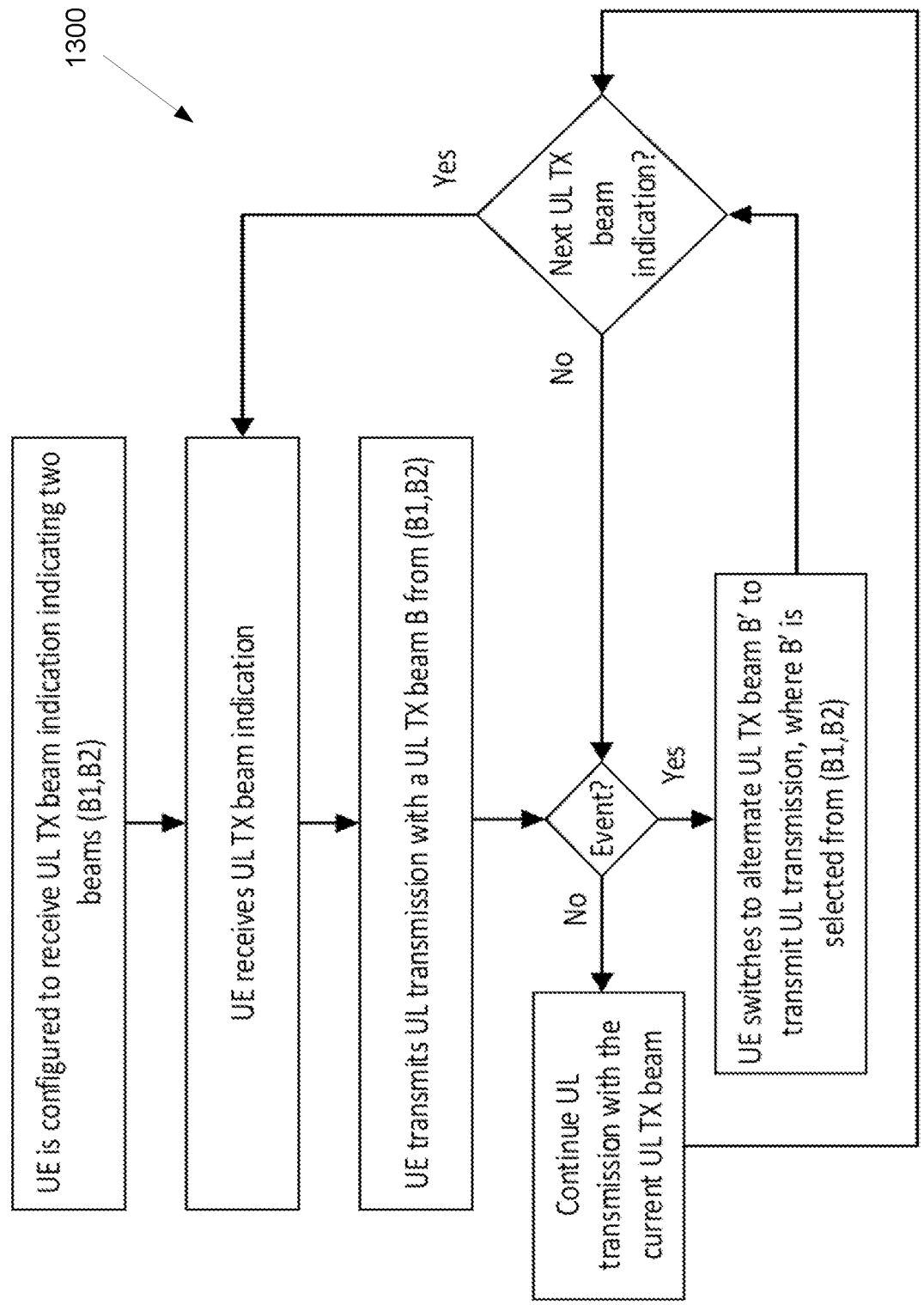
FIG. 13 illustrates a flow diagram of a UE configured to receive an UL TX beam indication indicating two beams ($B_1$, $B_2$) according to embodiments of the present disclosure.

FIG. 13 illustrates a flow diagram of a UE configured to receive an UL TX beam indication indicating two beams ($B_1$, $B_2$) 1300. The embodiment of the UE configured to receive an UL TX beam indication indicating two beams ($B_1$, $B_2$) 1300 illustrated in FIG. 13 is for illustration only. FIG. 13 does not limit the scope of this disclosure to any particular implementation of the UE configured to receive an UL TX beam indication indicating two beams ($B_1$, $B_2$) 1300.

In one sub-embodiment (I.1), as shown in FIG. 13, a UE is configured to receive an UL TX beam indication indicating two beams ($B_1$, $B_2$), where $B_1$ is a first UL TX beam and $B_2$ is a second UL TX beam. The UE is further configured to transmit UL transmission (such as data transmission on PUSCH) with a UX TX beam B, where the UL TX beam B is one of the two beams ($B_1$, $B_2$).

The UE also performs an event detection procedure to determine whether an event of interest occurs while using the UL TX beam B for UL transmission, where a few examples of the event of interest are described above. If the event is not detected (i.e., declared negative), the UE continues to transmit UL transmission with the UL TX beam B. If the event is detected (i.e., declared positive), the UE switches to an alternate UL TX beam B' for UL transmission, where the alternate UL TX B'≠B and is one of the two beams ($B_1$, $B_2$). At least one of the following examples is used to determine UL TX beams for UL transmission in future time slots.

In one example, the UE continues to transmit UL transmission with the alternate UL TX beam B' until it receives an update of the UL TX beam indication in a future time slot.

In one example, the UE can switch back to the UL TX beam B for UL transmission, for example, when the event of interest is detected (i.e., declared positive) while using the alternate UL TX beam B' for UL transmission or when the event of interest is not detected (i.e., declared negative) if the UL TX beam B is used again for UL transmission.

In one example, the UL TX beam B is fixed, for example, to $B_1$. In one example, the UL TX beam B is configured, for example, B=$B_i$ and the index i ∈ {1,2} is configured via RRC and/or MAC CE and/or DCI. In one example, the UE is free to select the UL TX beam B from ($B_1$, $B_2$).

The information about the event occurrence can be acquired at the NW/gNB implicitly or explicitly. For implicit information, the UE may not report any message about the event occurrence, but the NW/gNB by some implementation can acquire the information, for example, based on the received UL transmission (since the UL TX beam switches from B to B' when the event occurs). For explicit information, the UE can explicitly report a pre-notification message to indicate to the NW/gNB that the event occurred. The NW/gNB can transmit the next UL TX beam indication (in a future time slot) depending on the acquired implicit or explicit information about the event occurrence.

In an alternative explicit method, which doesn't require any pre-notification message, the UE can include/report the information of the selected beam (either B or B'), or UL TCI state, e.g., using a 1-bit indication. In one example, this information can be included/reported together with the granted PUSCH transmission (either UCI only or multiplexed with the UL data). In one example, this information can be included/reported concurrently with the UL control on PUCCH within the same slot (either as a standalone information or multiplexed with other UCI or HARQ-ACK). In one example, this information can be included/reported together with the PRACH transmission. The UE can be configured with at least one UL reporting resource for including/reporting the information of the selected beam, where the at least one UL reporting resource corresponds to either PUCCH resource(s), PUSCH resource(s), or a combination between PUCCH and PUSCH resources, or PRACH resource(s). This resource configuration can be performed via higher-layer (RRC) signaling. Alternatively, the NW/gNB can signal a set of reserved resources dynamically via L1 or L2 DL control (PDCCH or MAC CE). In one example, the information of the selected beam can be included/multiplexed in the beginning portion (e.g., one of the allocated PRBs and/or the first OFDM symbol of the UL reporting resource) of the PUCCH or PUSCH transmission.

At least one of the following examples is used/configured regarding for the inclusion of the information of the selected UL TX beam selection on PUCCH and/or PUSCH and/or PRACH.

- In one example I.1.1, the UE is configured via a higher layer (RRC) configuration for the reporting/inclusion of the UE-selected UL TX beam or TCI state. The configuration can include a dedicated parameter for this purpose. Alternatively, the configuration can be jointly via an existing higher layer RRC parameter. This configuration can be subject to UE capability, i.e., only when the UE reports that it is capable of such inclusion/reporting, the NW/gNB can configure the UE for the inclusion/reporting of the UE selected UE TX beam.
- In one example I.1.2, the UE is dynamically signaled via MAC CE and/or DCI for the reporting/inclusion of the UE-selected UL TX beam or TCI state. The dynamic signaling can include a dedicated parameter or field for this purpose. Alternatively, this can be jointly via an existing parameter or field. This signaling can be subject to UE capability, i.e., only when the UE reports that it is capable of such inclusion/reporting, the NW/gNB can signal the UE for the inclusion/reporting of the UE selected UE TX beam.
- In one example I.1.3, the UE is configured via a combination of higher layer (RRC) configuration and MAC CE (or DCI) signaling to configure the reporting/inclusion of the UE-selected UL TX beam or TCI state. This configuration can be subject to UE capability, i.e., only when the UE reports that it is capable of such inclusion/reporting, the NW/gNB can configure/signal the UE for the inclusion/reporting of the UE selected UE TX beam.
- In one example I.1.4, the configuration/signaling regarding the reporting/inclusion of the UE-selected UL TX beam or TCI state (as described in example I.1.1 through I.1.3) is restricted only to the case when the UE is equipped with multiple antenna panels. That is, for a UE with single antenna panel, such inclusion/reporting is not allowed (can't be configured).
- In one example I.1.5, the configuration/signaling regarding the reporting/inclusion of the UE-selected UL TX beam or TCI state (as described in example I.1.1 through I.1.3) is restricted only to an event of interest (such as MPE issue).

The event detection by the UE can be based on at least one DL measurement RS such as CSI-RS or SSB, which can be configured specifically for the purpose of event detection, or it can be from the DL measurement RS(s) configured for beam measurement, beam reporting and beam indication.

In this sub-embodiment, the UE starts transmitting UL transmission with the UL TX beam B, then performs the event detection, and if the event is declared positive, the UE switches to the alternate UL TX beam B' for UL transmission.

Figure 14:
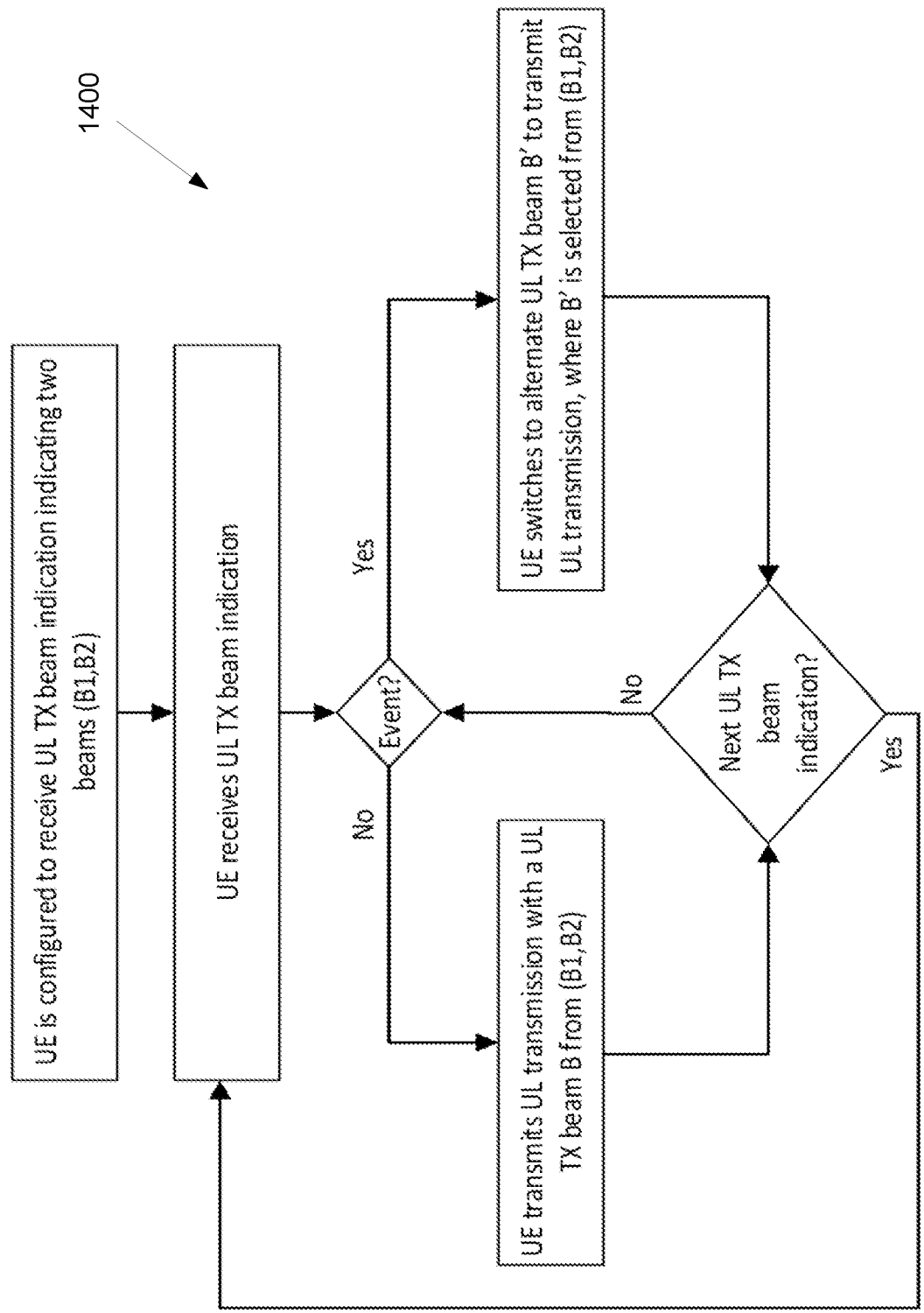
FIG. 14 illustrates a flow diagram of a UE configured to receive an UL TX beam indication indicating two beams ($B_1$, $B_2$) according to embodiments of the present disclosure.

FIG. 14 illustrates a flow diagram of a UE configured to receive an UL TX beam indication indicating two beams ($B_1$, $B_2$) 1400. The embodiment of the UE configured to receive an UL TX beam indication indicating two beams ($B_1$, $B_2$) 1400 illustrated in FIG. 14 is for illustration only. FIG. 14 does not limit the scope of this disclosure to any particular implementation of the UE configured to receive an UL TX beam indication indicating two beams ($B_1$, $B_2$) 1400.

In one sub-embodiment (I.2), as shown in FIG. 14, a UE is configured to receive an UL TX beam indication indicating two beams ($B_1$, $B_2$), where $B_1$ is a first UL TX beam and $B_2$ is a second UL TX beam. The UE first performs the event detection, and if the event is declared negative, the UE transmits UL transmission (such as data transmission on PUSCH) with a UL TX beam B, else the UE transmits UL transmission with the alternate UL TX beam B', where B≠B' and B and B' are selected from the two beams ($B_1$, $B_2$). The UE repeats these steps until the UE receives the next UL TX beam indication in a future time slot.

The rest of the details of this sub-embodiment are the same as sub-embodiment I.1. In particular, as described in sub-embodiment I.1, the information about the event occurrence can be acquired at the NW/gNB implicitly or explicitly. For implicit information, the UE may not report any message about the event occurrence, but the NW/gNB by some implementation can acquire the information, for example, based on the received UL transmission (since the UL TX beam switches from B to B' when the event occurs). For explicit information, the UE can explicitly report a pre-notification message to indicate to the NW/gNB that the event occurred. The NW/gNB can transmit the next UL TX beam indication (in a future time slot) depending on the acquired implicit or explicit information about the event occurrence.

In an alternative explicit method, which doesn't require any pre-notification message, the UE can include/report the information of the selected beam (either B or B'), or UL TCI state, e.g., using a 1-bit indication. In one example, this information can be included/reported together with the granted PUSCH transmission (either UCI only or multiplexed with the UL data). In one example, this information can be included/reported concurrently with the UL control on PUCCH within the same slot (either as a standalone information or multiplexed with other UCI or HARQ-ACK). In one example, this information can be included/reported together with the PRACH transmission. The UE can be configured with at least one UL reporting resource for including/reporting the information of the selected beam, where the at least one UL reporting resource corresponds to either PUCCH resource(s), PUSCH resource(s), or a combination between PUCCH and PUSCH resources, or PRACH resource(s). This resource configuration can be performed via higher-layer (RRC) signaling. Alternatively, the NW/gNB can signal a set of reserved resources dynamically via L1 or L2 DL control (PDCCH or MAC CE). In one example, the information of the selected beam can be included/multiplexed in the beginning portion (e.g., one of the allocated PRBs and/or the first OFDM symbol of the UL reporting resource) of the PUCCH or PUSCH transmission.

At least one of the examples I.1.1 through I.1.5 can be used/configured regarding for the inclusion of the information of the selected UL TX beam selection on PUCCH and/or PUSCH and/or PRACH.

In one example, the UE uses one of sub-embodiments I.1 and I.2 for UL transmission depending on the event of interest. For instance, if the event of interest is MPE, then the UE uses sub-embodiment I.2, and if the event of interest is related to HW limitation or beam failure, then the UE uses sub-embodiment I.1. In another example, one of sub-embodiments I.1 and I.2 is configured to the UE, for example, via RRC and/or MAC CE and/or DCI. In another example, one of sub-embodiments I.1 and I.2 is fixed (used) for UL transmission. In another example, the UE reports one of or both of sub-embodiments I.1 and I.2 in its capability signaling, and the NW/gNB configures one of them subject to the reported UE capability.

Figure 15:
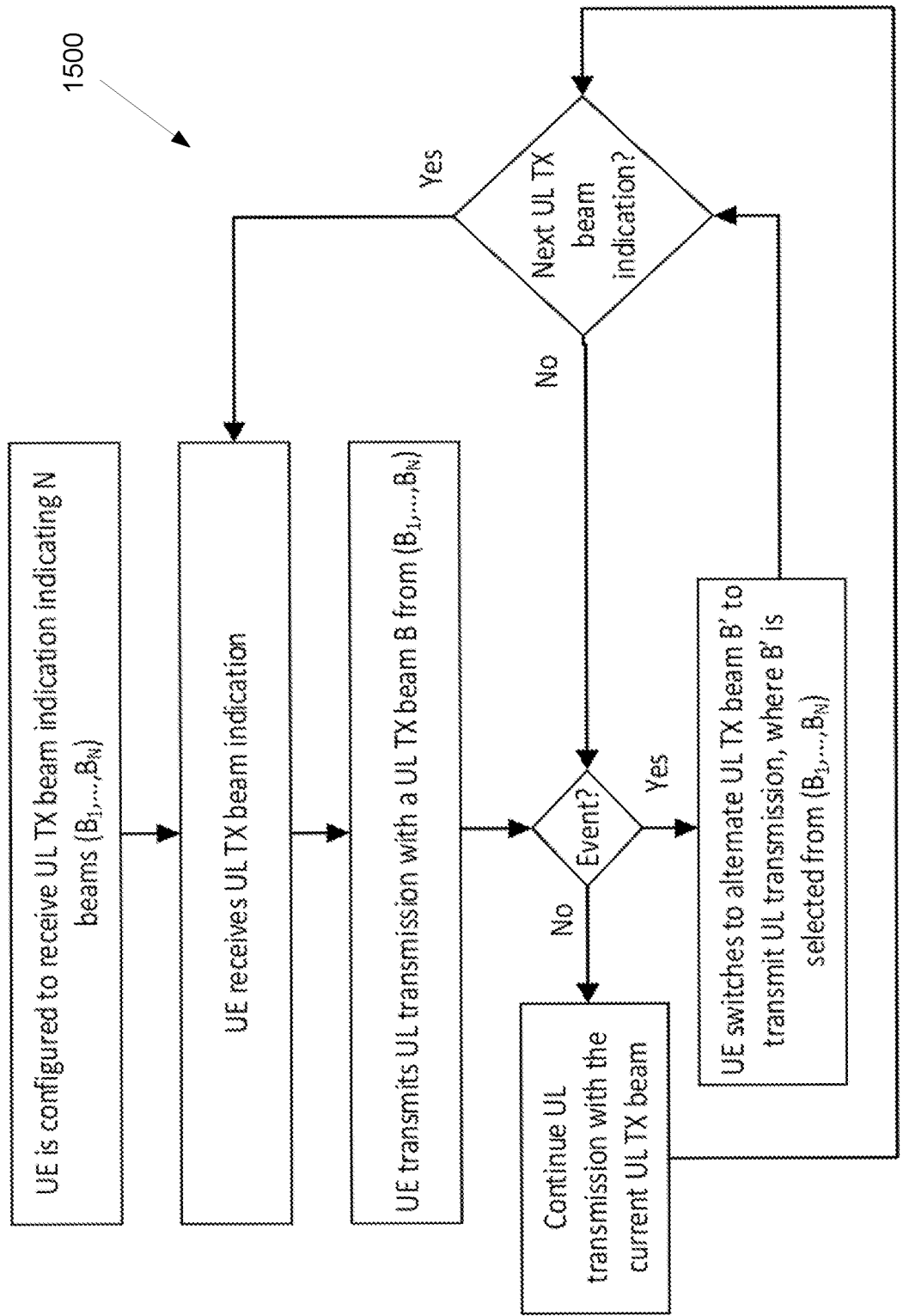
FIG. 15 illustrates a flow diagram of a UE configured to receive an UL TX beam indication indicating N beams ($B_1$, $B_2$, ..., $B_N$) according to embodiments of the present disclosure.

FIG. 15 illustrates a flow diagram of a UE configured to receive an UL TX beam indication indicating N beams ($B_1, B_2, \ldots, B_N$) 1500. The embodiment of the UE configured to receive an UL TX beam indication indicating N beams ($B_1, B_2, \ldots, B_N$) 1500 illustrated in FIG. 15 is for illustration only. FIG. 15 does not limit the scope of this disclosure to any particular implementation of the UE configured to receive an UL TX beam indication indicating N beams ($B_1, B_2, \ldots, B_N$) 1500.

In one sub-embodiment (I.3), as shown in FIG. 15, a UE is configured to receive an UL TX beam indication indicating N beams ($B_1, B_2, \ldots, B_N$), where $B_1$ is a first UL TX beam, $B_2$ is a second UL TX beam, ... $B_N$ is a N-th UL TX beam. The UE is further configured to transmit UL transmission (such as data transmission on PUSCH) with a UX TX beam B, where the UL TX beam B is selected from the N beams ($B_1, B_2, \ldots, B_N$).

The UE also performs an event detection procedure to determine whether an event of interest occurs while using the UL TX beam B for UL transmission, where a few examples of the event of interest is described above. If the event is not detected (i.e., declared negative), the UE continues to transmit UL transmission with the UL TX beam B. If the event is detected (i.e., declared positive), the UE switches to an alternate UL TX beam B' for UL transmission, where the alternate UL TX B'≠B and is selected from the N beams ($B_1, B_2, \ldots, B_N$). At least one of the following examples is used to determine UL TX beams for UL transmission in future time slots.

In one example, the UE continues to transmit UL transmission with the alternate UL TX beam B' until it receives an update of the UL TX beam indication in a future time slot.

In one example, the UE can switch to a second alternate UL TX beam B" for UL transmission, for example, when the event of interest is detected (i.e., declared positive) while using any one of B and B' for UL transmission, where B"≠B', B"≠B, and B" is selected from the N beams ($B_1, B_2, \ldots, B_N$).

In one example, the UE can switch back to the UL TX beam B for UL transmission, for example, when the event of interest is detected (i.e., declared positive) while using any one of alternate UL TX beam B', B", ... for UL transmission or when the event of interest is not detected (i.e., declared negative) if the UL TX beam B is used again for UL transmission.

In one example, the UL TX beam B is fixed, for example, to $B_1$. In one example, the UL TX beam B is configured, for example, B=$B_1$ and the index i $\in \{1, \ldots, N\}$ is configured via RRC and/or MAC CE and/or DCI. In one example, the UE is free to select the UL TX beam B from ($B_1, \ldots, B_N$).

In one example, the N UL TX beams are ordered (sorted) in decreasing order of priority such that $B_i$ is higher priority than $B_j$ if i<j. When the event is declared positive, the UE selects the highest priority UL TX beam for UL transmission from the set of candidate UL TX beams (that corresponds to the set ($B_1, B_2, \ldots, B_N$) minus the UL TX beam when the event is declared). The priority order of the N beams can be fixed (e.g., based on their indices), or it is configured via RRC and/or MAC CE and/or DCI.

The value of N is either fixed (e.g., N=2, N=number of antenna panels at the UE), or configured via RRC and/or MAC CE and/or DCI. Alternatively, the UE reports at least one N value that it supports. Such a reporting can be via UE capability signaling. Alternatively, the UE reports one N value which corresponds to a number of active antenna panels out of a total number of antenna panels at the UE. Note that the number of active antenna panels can be less that the total number of antenna panels at the UE.

As described in sub-embodiment I.1, the information about the event occurrence can be acquired at the NW/gNB implicitly or explicitly. For implicit information, the UE may not report any message about the event occurrence, but the NW/gNB by some implementation can acquire the information, for example, based on the received UL transmission (since the UL TX beam switches from B to B' when the event occurs). For explicit information, the UE can explicitly report a pre-notification message to indicate to the NW/gNB that the event occurred. The NW/gNB can transmit the next UL TX beam indication (in a future time slot) depending on the acquired implicit or explicit information about the event occurrence.

In an alternative explicit method, which doesn't require any pre-notification message, the UE can include/report the information of the selected beam (either B or B'), or UL TCI state, e.g., using a $\lceil \log_2 N \rceil$ bit indication. In one example, this information can be included/reported together with the granted PUSCH transmission (either UCI only or multiplexed with the UL data). In one example, this information can be included/reported concurrently with the UL control on PUCCH within the same slot (either as a standalone information or multiplexed with other UCI or HARQ-ACK). In one example, this information can be included/reported together with the PRACH transmission. The UE can be configured with at least one UL reporting resource for including/reporting the information of the selected beam, where the at least one UL reporting resource corresponds to either PUCCH resource(s), PUSCH resource(s), or a combination between PUCCH and PUSCH resources, or PRACH resource(s). This resource configuration can be performed via higher-layer (RRC) signaling. Alternatively, the NW/gNB can signal a set of reserved resources dynamically via L1 or L2 DL control (PDCCH or MAC CE). In one example, the information of the selected beam can be included/multiplexed in the beginning portion (e.g., one of the allocated PRBs and/or the first OFDM symbol of the UL reporting resource) of the PUCCH or PUSCH transmission. At least one of the examples I.1.1 through I.1.5 can be used/configured regarding for the inclusion of the information of the selected UL TX beam selection on PUCCH and/or PUSCH and/or PRACH.

The event detection by the UE can be based on at least one DL measurement RS such as CSI-RS or SSB, which can be configured specifically for the purpose of event detection, or it can be from the DL measurement RS(s) configured for beam measurement, beam reporting and beam indication.

In this sub-embodiment, the UE starts transmitting UL transmission with the UL TX beam B, then performs the event detection, and if the event is declared positive, the UE switches to the alternate UL TX beam B' for UL transmission.

Figure 16:
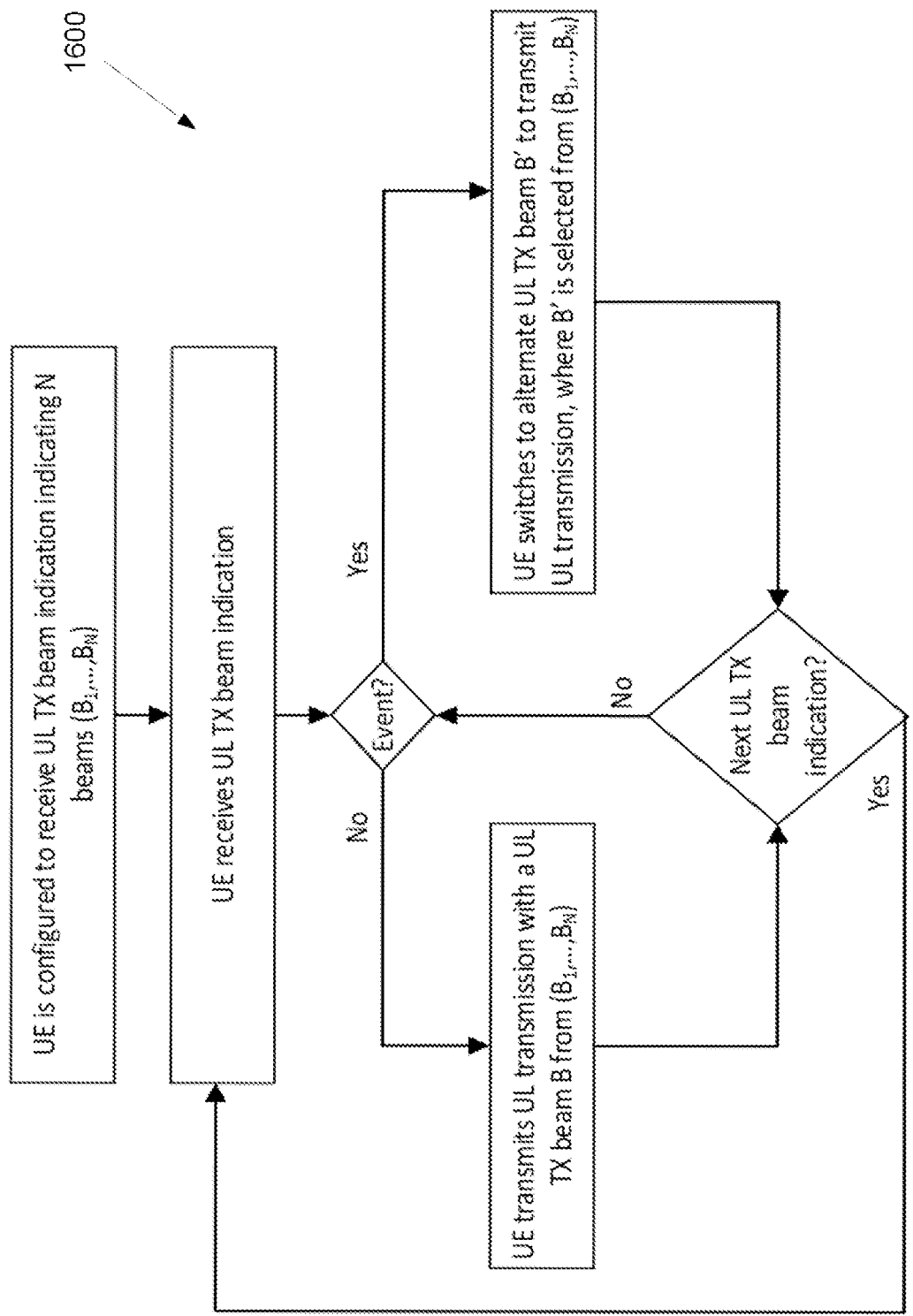
FIG. 16 illustrates a flow diagram of a UE configured to receive an UL TX beam indication indicating N beams ($B_1$, $B_2$, ..., $B_N$) according to embodiments of the present disclosure.

FIG. 16 illustrates a flow diagram of a UE configured to receive an UL TX beam indication indicating N beams ($B_1$, $B_2$, ..., $B_N$) 1600. The embodiment of the UE configured to receive an UL TX beam indication indicating N beams ($B_1$, $B_2$, ..., $B_N$) 1600 illustrated in FIG. 16 is for illustration only. FIG. 16 does not limit the scope of this disclosure to any particular implementation of the UE configured to receive an UL TX beam indication indicating N beams ($B_1$, $B_2$, ..., $B_N$) 1600.

In one sub-embodiment (1.4), as shown in FIG. 16, a UE is configured to receive UL TX beam indication indicating N beams ($B_1$, $B_2$, ..., $B_N$), where $B_1$ is a first UL TX beam, $B_2$ is a second UL TX beam, ... $B_N$ is a N-th UL TX beam. The UE first performs the event detection, and if the event is declared negative, the UE transmits UL transmission (such as data transmission on PUSCH) with a UL TX beam B, else the UE transmits UL transmission with the alternate UL TX beam B', where B≠B' and B and B' are selected from the N beams ($B_1$, $B_2$, ..., $B_N$). The UE repeats these steps until the UE receives the next UL TX beam indication in a future time slot.

The rest of the details of this sub-embodiment are the same as sub-embodiment I.3. In particular, as described in sub-embodiment I.1, the information about the event occurrence can be acquired at the NW/gNB implicitly or explicitly. For implicit information, the UE may not report any message about the event occurrence, but the NW/gNB by some implementation can acquire the information, for example, based on the received UL transmission (since the UL TX beam switches from B to B' when the event occurs). For explicit information, the UE can explicitly report a pre-notification message to indicate to the NW/gNB that the event occurred. The NW/gNB can transmit the next UL TX beam indication (in a future time slot) depending on the acquired implicit or explicit information about the event occurrence.

In an alternative explicit method, which doesn't require any pre-notification message, the UE can include/report the information of the selected beam (either B or B'), or UL TCI state, e.g., using a $\lceil \log_2 N \rceil$ bit indication. In one example, this information can be included/reported together with the granted PUSCH transmission (either UCI only or multiplexed with the UL data). In one example, this information can be included/reported concurrently with the UL control on PUCCH within the same slot (either as a standalone information or multiplexed with other UCI or HARQ-ACK). In one example, this information can be included/reported together with the PRACH transmission. The UE can be configured with at least one UL reporting resource for including/reporting the information of the selected beam, where the at least one UL reporting resource corresponds to either PUCCH resource(s), PUSCH resource(s), or a combination between PUCCH and PUSCH resources, or PRACH resource(s). This resource configuration can be performed via higher-layer (RRC) signaling. Alternatively, the NW/gNB can signal a set of reserved resources dynamically via L1 or L2 DL control (PDCCH or MAC CE). In one example, the information of the selected beam can be included/multiplexed in the beginning portion (e.g., one of the allocated PRBs and/or the first OFDM symbol of the UL reporting resource) of the PUCCH or PUSCH transmission. At least one of the examples I.1.1 through I.1.5 can be used/configured regarding for the inclusion of the information of the selected UL TX beam selection on PUCCH and/or PUSCH and/or PRACH.

In one example, the UE uses one of sub-embodiments I.3 and I.4 for UL transmission depending on the event of interest. For instance, if the event of interest is MPE, then the UE uses sub-embodiment I.4, and if the event of interest is related to HW limitation or beam failure, then the UE uses sub-embodiment I.3. In another example, one of sub-embodiments I.3 and I.4 is configured to the UE, for example, via RRC and/or MAC CE and/or DCI. In another example, one of sub-embodiments I.3 and I.4 is fixed (used) for UL transmission. In another example, the UE reports one of or both of sub-embodiments I.3 and I.4 in its capability signaling, and the NW/gNB configures one of them subject to the reported UE capability.

Figure 17:
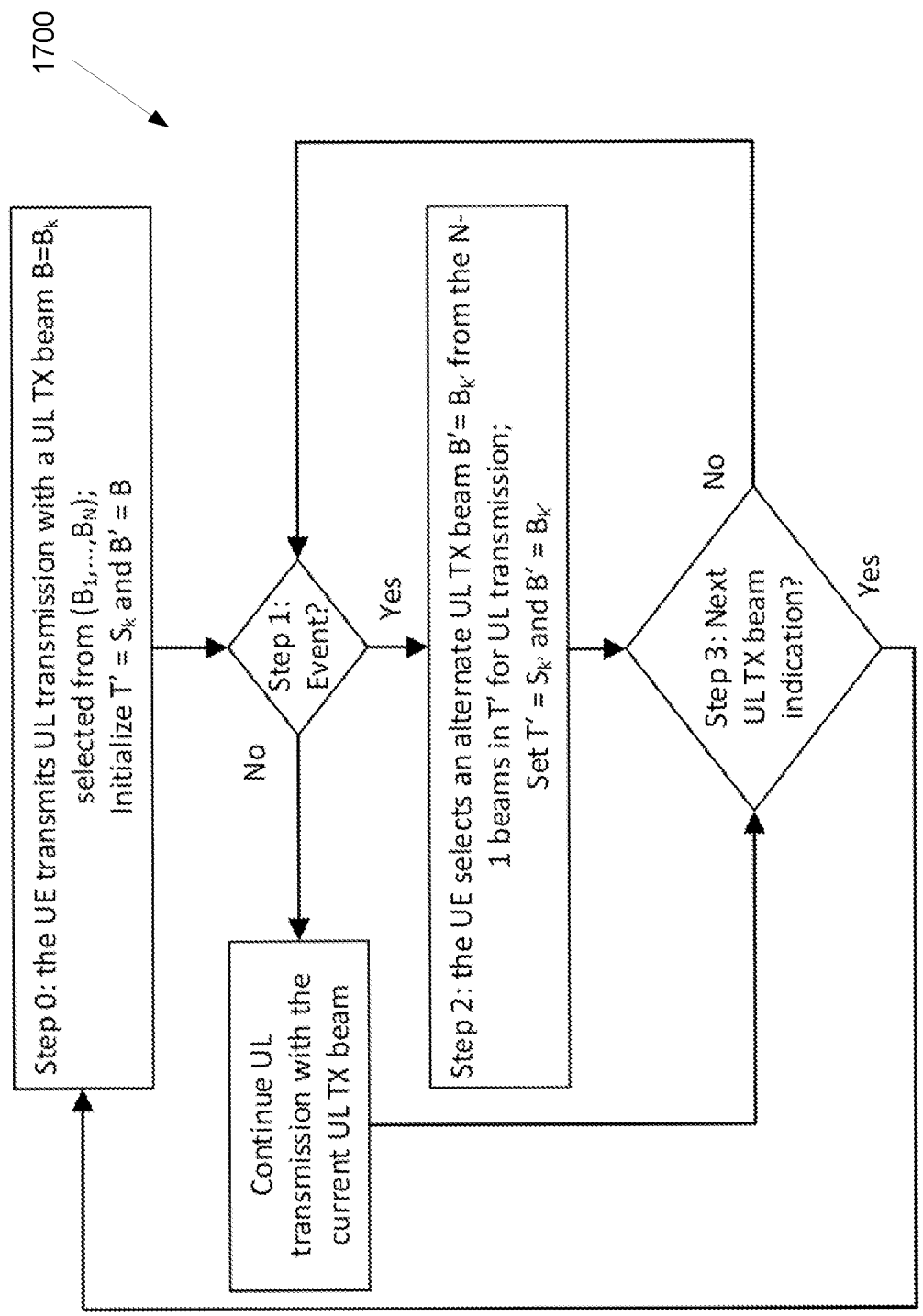
FIG. 17 illustrates an algorithmic description of the UL TX beam selection for UL transmission according to embodiments of the present disclosure.

FIG. 17 illustrates an algorithmic description of the UL TX beam selection for UL transmission 1700. The embodiment of the algorithmic description of the UL TX beam selection for UL transmission 1700 illustrated in FIG. 17 is for illustration only. FIG. 17 does not limit the scope of this disclosure to any particular implementation of the algorithmic description of the UL TX beam selection for UL transmission 1700.

In one sub-embodiment (I.5), as shown in FIG. 17, an algorithmic description of the UL TX beam selection for UL transmission as described in embodiments I.3 through I.4 can include the following steps.

Let $S_1=(B_2, \ldots, B_N)$, $S_N=(B_1, \ldots, B_{N-1})$, and $S_k=(B_1, \ldots, B_{k-1}, B_{k+1}, \ldots, B_N)$ for $k \in \{2, \ldots, N-1\}$. Note $S_k$ corresponds to N−1 UL TX beams obtained after removing the UL TX beams $B_k$.

Step 0: The UE transmits UL transmission with a UL TX beam B selected from the N beams ($B_1$, $B_2$, ..., $B_N$). Let $B=B_k$ where k E {1, 2, ..., N}. Initialize $T'=S_k$ and B'=B.

Step 1: Check if the event of interest is detected (i.e., declared positive). If yes, proceed to Step 2; else the UE continues UL transmission with the current UL TX beam and proceeds to Step 3.

Step 2: The UE selects an alternative UL TX beam B' from the N−1 beams in T' for UL transmission. Let k' be the index of the alternate UL TX beam B, i.e., $B'=B_{k'}$, and set $T'=S_{k'}$.

Step 3: If next UL TX beam indication is received, proceed to Step 0; else proceed to Step 1.

In one sub-embodiment (I.6), when the UE can transmit (or is capable of transmitting) UL transmission with two UL TX beams simultaneously, the UE transmits UL transmission using both UL TX beams ($B_1$, $B_2$) as long as the event of interest is not declared with any of the two beams ($B_1$, $B_2$). When the event of interest is declared (positive) with a beam B from the two beams ($B_1$, $B_2$), the UE transmits UL transmission using the other (alternate) UL TX beam (≠B) from the two beams ($B_1$, $B_2$). The UE repeats these steps until it receives the next UL TX beam indication in a future time slot. Upon the reception of the next UL TX beam indication, the UE updates the two beams ($B_1$, $B_2$), and proceeds with UL transmission using the two new UL TX beams as described above. If the UE receives N>2 beams via the UL TX beam indication, then the UE selects two beams from the N beams before proceeding with UL transmission described above, where the selection of the two beams can be fixed or configured via RRC and/or MAC CE and/or DCI.

Component 2—Alternate UL TX Beam(s) Measurement, Reporting, and Indication

In one embodiment (II), a UE is configured to receive DL RS(s) (or transmit UL RS(s)) for beam measurement at the UE (or at the gNB). The UE can further be configured with beam reporting. The beam measurement and beam reporting are configured in order to facilitate UL TX beam indication indicating multiple UL TX beams as described in embodiment I and sub-embodiments I.1 through I.6. Note that this configuration of beam measurement and reporting is separate (different) from the explicit indication/reporting of the UL beam or TCI state selection (B or B') for UL transmission, as described earlier in the disclosure. That is, the UL beam selection is not a part of beam reporting—rather it is a companion to the granted UL transmission. The beam reporting (from the UE) is to facilitate beam indication (from the NW/gNB) indicating the beams ($B_1, \ldots, B_N$), and the UL beam selection (from the UE) is to let gNB/NW know about the UL TX beam selected for the UL transmission from the indicated beams ($B_1, \ldots, B_N$).

In one sub-embodiment (II.1), a UE is configured to perform beam measurement and reporting according to at least one of the following examples.

In one example II.1.1, the UE is configured (by the NW/gNB) to measure (receive) $P_1$ DL measurement RS resources (such as CSI-RS or SSB), where $P_1 \geq 1$. This configuration can be performed via higher-layer (RRC) signaling. Optionally, the NW/gNB can signal/update the (sub)set of DL measurement RS resources dynamically via L1 or L2 DL control (PDCCH or MAC CE). These resources are used by the UE to perform beam measurement along different beams or spatial directions (represented by the beamforming/precoding operation performed at the NW/gNB transparent to the UE). The UE is further configured (by the NW/gNB) to report $Q_1$ resource indicators (I) or $Q_1$ pairs of (1,1)=(resource indicator, beam metric), where $Q_1 \leq P_1$. The beam metric can represent link quality associated with data (PDSCH) and/or dedicated control (PDCCH). Examples of beam metric include L1-RSRP, L1-SINR, CQI, or hypothetical BLER, or any other beam metric. The resource indicator indicates a DL measurement RS resource index from the $P_1$ DL measurement RS resources. Examples of resource indicator include CRI (when DL measurement RS is CSI-RS) and SSB-RI (when DL measurement RS is SSB). The time-domain behavior of this beam reporting can be configured as aperiodic (AP), semi-persistent (SP), or periodic (P). The NW/gNB receives $Q_1$ resource indicators (I) or $Q_1$ pairs of (I, J)=(resource indicator, beam metric), and uses them to configure the UL TX beam indication indicating N UL TX beams (for the UE). In one example, $N=N_1$. In one example, $N_1$ is configured via RRC and/or MAC CE and/or DCI.

In one example II.1.2, the UE is configured (by the NW/gNB) to measure (receive) $P_1$ DL measurement RS resources (such as CSI-RS or SSB), where $P_1 \geq 1$. The details of this beam measurement are as described above in Example II.1.1. The UE is further configured (by the NW/gNB) to report $Q_1$ resource indicator sets or $Q_1$ pairs of (resource indicator sets, beam metric), where $Q_1 \leq P_1$, and each resource indicator set includes $N_1$ resource indicators ($I_1, \ldots I_N$) with $I_i$ being the i-th resource indicator in the set. The details about beam metric, resource indicator, and time-domain behavior of beam reporting are as described above in Example II.1.1. The NW/gNB receives $Q_1$ resource indicator sets or $Q_1$ pairs of (resource indicator sets, beam metric), and uses them to configure the UL TX beam indication indicating N UL TX beams (for the UE). In one example, $N=N_1$. In one example, $N_1$ is configured via RRC and/or MAC CE and/or DCI.

In one example II.1.3, the UE is configured (by the NW/gNB) to measure (receive) $P_1$ DL measurement RS resources (such as CSI-RS or SSB), where $P_1 > 1$. The details of this beam measurement are as described above in Example II.1.1. The UE is further configured (by the NW/gNB) to report ($R_1, \ldots R_N$) or ($R_1, \ldots R_N$, beam metric), where for each i, $R_i$ is a set of resource indicators for the i-th beam in N UL TX beams (indicated by the NW/gNB). The details about beam metric, resource indicator, and time-domain behavior of beam reporting are as described above in Example II.1.1. The NW/gNB receives ($R_1, \ldots R_N$) or ($R_1, \ldots R_N$, beam metric), and uses it to configure the UL TX beam indication indicating N UL TX beams (for the UE).

In one example II.1.4, the UE is configured (by the NW/gNB) to measure (receive) $P_1$ DL measurement RS resources (such as CSI-RS or SSB), where $P_1 > 1$. The details of this beam measurement are as described above in Example II.1.1. The is further configured with a set X comprising candidate resource indicators ($I_1, \ldots I_N$) for UL TX beam indication, where $I_i$ corresponds to the DL measurement RS for the i-th beam in N UL TX beams (indicated by the NW/gNB). The UE is further configured (by the NW/gNB) to report $Q_1$ resource indicators ($I_1, \ldots I_N$) or $Q_1$ pairs of (resource indicators, beam metric)=($I_1, \ldots I_N$, beam metric), where $Q_1 \geq 1$, and the reported resource indicators ($I_1, \ldots I_N$) are from the configured set X. The details about beam metric, resource indicator, and time-domain behavior of beam reporting are as described above in Example II.1.1. The NW/gNB receives $Q_1$ resource indicators ($I_1, \ldots I_N$) or $Q_1$ pairs of (resource indicators, beam metric)=($I_1, \ldots I_N$, beam metric), and uses them to configure the UL TX beam indication indicating N UL TX beams (for the UE).

In one example II.1.5, the UE is configured (by the NW/gNB) to measure (receive) N sets of DL measurement RS resources (such as CSI-RS or SSB), where the i-th set of DL measurement RS resources is for the i-th beam in N UL TX beams (indicated by the NW/gNB). The details of this beam measurement are as described above in Example II.1.1. In one example, N sets are associated with N antenna panels at the UE. In one example, N sets are associated with N range of spatial (or beam) directions at the UE. The UE is further configured (by the NW/gNB) to report $Q_1$ resource indicator sets or $Q_1$ pairs of (resource indicator sets, beam metric), where $Q_1 \geq 1$, and each resource indicator set includes N resource indicators ($I_1, \ldots I_N$) with $I_i$ being the i-th resource indicator in the set that is selected from the i-th set of DL measurement RS resources. The details about beam metric, resource indicator, and time-domain behavior of beam reporting are as described above in Example II.1.1. The NW/gNB receives $Q_1$ resource indicator sets or $Q_1$ pairs of (resource indicator sets, beam metric), and uses them to configure the UL TX beam indication indicating N UL TX beams (for the UE).

In one example II.1.6, the UE is configured (by the NW/gNB) to transmit $P_2$ UL measurement RS resources (such as SRS), where $P_2 \geq 1$. This configuration can be performed via higher-layer (RRC) signaling. Optionally, the NW/gNB can signal/update the (sub)set of UL measurement RS resources dynamically via L1 or L2 DL control (PDCCH or MAC CE). These SRS resources can be used by the NW/gNB to perform beam measurement along different beams or spatial directions (represented by the beamforming/precoding operation performed at the UE transparent to the NW/gNB). The UE can optionally be configured to report $Q_2$ candidate UL TX beam indications, e.g., via UL-TCI(s), where UL-TCI represents an UL TCI state as configured in the UL TCI state definition (via higher-layer signaling) wherein a TCI state is linked/associated to a measurement RS that can be used to represent an UL "direction" (i.e., UL TX beam). In this sub-embodiment, the UL TCI state is linked to an SRS resource index (SRI) which represents a configured SRS resource since SRS is used to measure the link quality of the UL channel(s).

The NW/gNB receives (measures) $P_2$ UL measurement RS resources (and, optionally, $Q_2$ candidate UL TX beam indications), and uses them to configure the UL TX beam indication indicating N UL TX beams (for the UE).

In one example II.1.7, the UE is configured (by the NW/gNB) to transmit N sets of UL measurement RS resources (such as SRS), where the i-th set of UL measurement RS resources is for the i-th beam in N UL TX beams (indicated by the NW/gNB). The details of the UL measurement RS resource are as described above in Example II.1.6. In one example, N sets are associated with N antenna panels at the UE. In one example, N sets are associated with N range of spatial (or beam) directions at the UE. The UE can optionally be configured to report $Q_2$ candidate UL TX beam indications, e.g., via UL-TCI(s), where UL-TCI represents an UL TCI state as configured in the UL TCI state definition (via higher-layer signaling) wherein a TCI state is linked/associated to a measurement RS that can be used to represent an UL "direction" (i.e., UL TX beam). In this sub-embodiment, the UL TCI state is linked N SRS resource indices (SRIs), one from each of the N sets of UL measurement RS resources.

The NW/gNB receives (measures) N sets of UL measurement RS resources (and, optionally, $Q_2$ candidate UL TX beam indications), and uses them to configure the UL TX beam indication indicating N UL TX beams (for the UE).

In one example II.1.8, the UE is configured (by the NW/gNB) to transmit $P_2$ UL measurement RS resources (cf. Example II.1.6) or N sets of UL measurement RS resources (cf. Example II.1.7). The details of the UL measurement RS resource are as described above in Example II.1.6. In one example, N sets are associated with N antenna panels at the UE. In one example, N sets are associated with N range of spatial (or beam) directions at the UE. The UE is further configured to report multiple sets of candidate UL TX beam indications, e.g., via UL-TCI(s), where multiple sets can be associated with multiple antenna panels at the UE, or multiple range of spatial (or beam) directions at the UE.

The NW/gNB receives (measures) UL measurement RS resources and multiple sets of candidate UL TX beam indications, and selects a beam from each set, or selects a subset of the multiple sets, and then selects a beam from each subset. The NW/gNB then uses them to configure the UL TX beam indication indicating N UL TX beams (for the UE).

In one example II.1.9, the UE is configured (by the NW/gNB) to measure (receive) $P_1$ DL measurement RS resources (such as CSI-RS or SSB), where $P_1 \geq 1$. The details of this beam measurement are as described above in Example II.1.1. The UE is further configured (by the NW/gNB) to report $Q_1$ resource indicators (I) or $Q_1$ pairs of (I, J)=(resource indicator, beam metric), where $Q_1 \leq P_1$.

The UE is also configured (by the NW/gNB) to transmit $P_2$ UL measurement RS resources (such as SRS), where $P_2 \geq 1$. The details of the UL measurement RS resource are as described above in Example II.1.6. The UE can optionally be configured to report $Q_2$ candidate UL TX beam indications, e.g., via UL-TCI(s).

The NW/gNB receives (measures) UL measurement RS resources, receives $Q_1$ resource indicators (I) or $Q_1$ pairs of (I, J)=(resource indicator, beam metric), and optionally receives $Q_2$ candidate UL TX beam indications. The NW/gNB then uses the received information to configure the UL TX beam indication indicating N UL TX beams (for the UE).

In one example, when N=2, a first of N UL TX beams ($B_1$) is selected based on $Q_1$ resource indicators (I) or $Q_1$ pairs of (I, J)=(resource indicator, beam metric), and a second of N UL TX beams ($B_2$) is selected based on $Q_2$ candidate UL TX beam indications.

In one example, when N>2, a first of N UL TX beams ($B_1$) is selected based on $Q_1$ resource indicators (I) or $Q_1$ pairs of (I, J)=(resource indicator, beam metric), and remaining N−1 of N UL TX beams ($B_2, \ldots, B_{N-2}$) are selected based on $Q_2$ candidate UL TX beam indications.

In one sub-embodiment (II.2), a UE is configured to receive the UL TX beam indication indicating N UL TX beams (as described above) via A-TCI where A=DL or UL or J (joint). The UE can be configured via RRC signaling with a set of TCI states, where each TCI state corresponds to a A-TCI indicating N UL TX beams. The UE can be configured to receive a MAC CE command that selects a TCI state from the set of TCI states. Alternatively, the UE can be configured to receive a MAC CE command that selects a subset of TCI states from the set of TCI states, and the UE can be furthered configured to receive a code point in DCI that indicates a TCI state from the subset of TCI states. At least one of the following examples is used for the UL TX beam indication.

In one example II.2.1, the UL TX beam indication indicating N UL TX beams is via UL-TCI(s). In one example, a joint (single) UL-TCI is used to indicate N UL TX beams (i.e., UL-TCI includes a TCI state ID and IDs of N DL or UL measurement RS resources each with one port, or UL-TCI includes a TCI state ID and an ID of DL or UL measurement RS resource with N ports). In one example, N (separate) UL-TCIs are used to indicate N UL TX beams, one for each UL TX beam (i.e., each UL-TCI includes a TCI state ID and an ID of a DL or UL measurement RS resource with one port). For UL operation (e.g., as in Rel. 15/16 NR), a UE can also be indicated separately with SRI(s) (in addition to UL-TCI(s)). Alternatively, SRI(s) is (are) indicated (jointly) via UL-TCI(s).

In one example II.2.2, one of the N UL TX beams is the same as DL TX beam, hence is indicated via DL-TCI (e.g., when beam correspondence holds), and the remaining N−1 UL TX beams are indicated via UL-TCI(s). In one example, a joint (single) UL-TCI is used to indicate N−1 UL TX beams. In one example, N−1 (separate) UL-TCIs are used to indicate N−1 UL TX beams, one for each UL TX beam. For UL operation (e.g., as in Rel. 15/16 NR), a UE can also be indicated separately with SRI(s) (in addition to UL-TCI(s)). Alternatively, SRI(s) is (are) indicated (jointly) via UL-TCI(s). Additionally, the information whether the beam indicated via DL-TCI is the primary beam (e.g., $B_1$), or one of the remaining beams indicated via UL-DCI(s) is the primary beam is provided (e.g., via a flag or parameter). This information can be provided via RRC and/or MAC CE and/or DCI.

In one example II.2.3, the beam indication indicating N beams ($B_1, \ldots, B_N$) is via UL-TCI(s) or DL-DCI(s) or J-TCI(s), where this beam indication is common for both DL reception and UL transmission (e.g., assuming beam correspondence holds). In one example, a joint (single) A-TCI is used to indicate N beams. In one example, N (separate) A-TCIs are used to indicate N beams, one for each beam. Here, A is either UL or DL or J.

In one example, a beam $B_{DL}$ from ($B_1, \ldots, B_N$) is used for DL reception, and beams ($B_1, \ldots, B_N$) are used for UL transmission as described in this disclosure. In one example, $B_{DL}=B_i$ where i is fixed (e.g., to 1). In one example, $B_{DL}$ is configured via RRC and/or MAC CE and/or DCI.

In one example II.2.4, the beam indication about one of the N beams ($B_1, \ldots, B_N$) is via TCI1, where TCI1 is either UL-TCI1 or DL-TCI1 or J-DCI1. The beam indication about the remaining N−1 beams, say N beams ($B_2, \ldots, B_N$) is via TCI2, where TCI2 is either UL-TCI2 or DL-TCI2 or J-TCI2.

In one example II.2.5, one of N beams is indicated via a TCI1 (that is indicated via DCI), and the remaining N−1 beams are indicated via TCI2 (that is indicated via MAC CE or RRC or a combination of MACE CE and RRC).

In one example II.2.6, the beam indication indicating N beams is according to one of Example II.2.1 through II.2.5 except the following. One of N beams ($B_1, \ldots, B_N$), say $B_1$, is always indicated. The remaining N−1 beams, say N beams ($B_2, \ldots, B_N$) may or may not be indicated. The information whether remaining N−1 beams are indicated can be configured via RRC and/or MACE CE and/or DCI. When DCI is used, a two-stage DCI can be used, where the first stage DCI includes the information whether remaining N−1 beams are indicated. Depending on this information in the first stage DCI, the second stage DCI may or may not be provided to the UE.

In one sub-embodiment (II.3), the beam measurement, beam reporting, and beam indication is subject to a restriction/condition.

Such restrictions can only be for some (not all) events such as MPE mitigation. Alternatively, such events can be applied regardless of the event. Also, the restriction can be applied in a non-transparent manner. For example, the UE can be configured to apply such restrictions and/or the UE can report that it is capable to applying such restrictions. At least one of the following examples is used for such restrictions.

In one example II.3.1, the restriction is based on a number of antenna panels (Z) at the UE. For instance, N=1 when Z=1, and N>1 when Z>1.

In one example II.3.2, the restriction is based on a minimum separation across N beams in angular/spatial domain. In one example of the restriction in angular domain, any two out of N beams are such that their beam pointing directions or beam patterns are (almost) non-overlapping (e.g., for MPE mitigation). In one example of the restriction in spatial domain, the N beams are orthogonal.

In one example II.3.2, the restriction is based on a combination of Example II.3.1 and Example II.3.2.

Component 3—Miscellaneous Embodiments

In one sub-embodiment (III.1), a UE is configured to receive UL TX beam indication indicating multiple (N) UL TX beams. The UE is further configured to transmit UL transmission (such as data transmission on PUSCH) with a UL TX beam B selected from the N UL TX beams. The UE selects the UL TX beams B for UL transmission and the gNB/NW receives UL transmission according to at least one of the following examples.

In one example III.1.1, the UE is free to select any of the N UL TX beams for UL transmission. The NW/gNB performs blind decoding for the selected UL TX beam B while receiving the UL transmission. Alternatively, the UE reports a message with the selected UL TX beam to the NW/gNB, which uses it to receive UL transmission.

In one example 111.1.2, The UE selects the UL TX beams B for UL transmission according to a priority order (fixed or configured priority), i.e., the UE selects the highest priority UL TX beam (e.g., $1^{st}$ beam $B_1$) for UL transmission. If an event of interest (as described in this disclosure) is not declared, the NW/gNB receives the UL transmission with a UL RX beam associated with the highest priority UL TX beam. Else, the UE switches to (selects) an alternate UL TX beam from the UE transmission. For example, the UE selects the second highest priority UL TX beam (e.g., $2^{nd}$ beam $B_2$) for UL transmission. When the second highest priority UL TX beam is selected, the NW/gNB performs blind decoding for the selected UL TX beam B while receiving the UL transmission. For example, the NW/gNB decodes using the second highest priority UL TX beam if the decoding fails using the highest priority UL TX beam. Alternatively, the UE reports a message with the selected UL TX beam to the NW/gNB, which uses it to receive UL transmission.

In one sub-embodiment (III.2), when the UE is configured with UL measurement RS (SRS) resources for UL TX beam indication as described in this disclosure, the configuration includes a higher layer parameter SRSResourceSet with 'usage' set to 'multiplepanels' or 'multiple UL TX beams' or 'BeamManagement', and the N UL TX beam indication is based on N SRS resources in SRSResourceSet. Alternatively, the configuration includes N higher layer parameters SRSResourceSet, each with 'usage' set to 'multiplepanels' or 'multiple UL TX beams' or 'BeamManagement', and the N UL TX beam indication is based on N SRS resources, one from each of N SRSResourceSet.

In one sub-embodiment (III.3), when the UE is configured with DL measurement RS (e.g., CSI-RS) resources for UL TX beam indication as described in this disclosure, the configuration includes a higher layer parameter CSI-RSResourceSet, and the N UL TX beam indication is based on N CSI-RS resources in CSI-RSResourceSet. Alternatively, the configuration includes N higher layer parameters CSI-RSResourceSet, and the N UL TX beam indication is based on N CSI-RS resources, one from each of N CSI-RSResourceSet.

In one sub-embodiment (III.4), a UE reports (either dynamically via L1 control, or via MAC CE, or via its capability signaling) information regarding its capability to receive N>1 UL TX beams. Alternatively, the UE reports (either dynamically via L1 control, or via MAC CE, or via its capability signaling) information regarding its capability to receive N>1 UL TX beams and an information whether the UE supports one antenna panel (SP) or multiple panels (MP) for UL transmission. Alternatively, the UE reports (either dynamically via L1 control, or via MAC CE, or via its capability signaling) information regarding its capability whether the UE supports one antenna panel (SP) or multiple panels (MP) for UL transmission. The UL TX beam indication is subject to the reported UE capability.

In one sub-embodiment (III.5), a UE is configured to select a UL TX beam from the beams ($B_1, \ldots, B_N$), indicated via the beam indication, for UL transmission, wherein the beam selection procedure is according to at least one of the following examples.

In one example, the beam selection is up to UE implementation, i.e., the UE is free to select any beam for UL transmission.

In one example, the beam selection is based on a priority order if an event of interest is not detected (e.g., MPE requirement is met); otherwise, the beam selection is up to UE implementation to select another panel, wherein the details of the priority order is as described in Example III.1.2.

In one example, the beam selection is based on a priority order if an event of interest is not detected (e.g., MPE requirement is met); otherwise, the beam selection is using a beam with the highest priority such that an event of interest is not detected (e.g., MPE requirement is met) with the selected beam.

In one example, the beam selection is based on a priority order such that an event of interest is not detected (e.g., MPE requirement is met) with the selected beam.

In one example, N equals a number of antenna panels at the UE, and hence beam selection is equivalent to panel selection in this case. In one example, when the UE is equipped with multiple antenna panels, the beam selection at the UE can be extended to include both beam and panel selection.

In one sub-embodiment (III.6), a UE is configured to report/indicate an information about the selected beam (and/or panel) to the NW/gNB, as described in embodiment III.4 and elsewhere in this disclosure, wherein the beam selection reporting/indication procedure is according to at least one of the following examples.

In one example, there is no beam (and/or panel) indication, i.e., the NW/gNB performs blind decoding for the selected UL TX beam B while receiving the UL transmission.

In one example, the UE indicates an information about the selected beam (and/or panel), e.g., beam ID or panel ID or an ID associated with beam or panel, to the NW/gNB that is used for upcoming UL transmission. The physical channel for this indication can be PUCCH or PUSCH or PRACH or a combination of at least two of PUCCH, PUSCH, and PRACH. When PUSCH is used for this indication, then a MAC CE can be used for this indication. When the MAC CE is absent (not provided), there is no change/update in the beam (and/or panel). Alternatively, the indication can be multiplexed with either UCI only or both UCI and data. When PUCCH is used for this indication, a field in PUCCH can be used for this indication. This field can be optionally included when a beam (and/or panel) changes.

In one example, the UE indicates an information about the selected beam (and/or panel), e.g., beam ID or panel ID or an ID associated with beam or panel, to the NW/gNB that is used for upcoming UL transmission only when there is a beam (and/or panel) change. The physical channel this indication can be PUCCH or PUSCH or PRACH or a combination of at least two of PUCCH, PUSCH, and PRACH. When PUSCH is used for this indication, then a MAC CE can be used for this indication. When the MAC CE is absent (not provided), there is no change/update in the beam (and/or panel). Alternatively, the indication can be multiplexed with either UCI only or both UCI and data. When PUCCH is used for this indication, a field in PUCCH can be used for this indication. This field can be optionally included when a beam (and/or panel) changes.

In one sub-embodiment (III.7), when the UE is configured with multiple component carriers (CCs), the physical DL and/or UL channels described in this disclosure to indicate beam (and/or panel) can be within the same CC, or different CCs. This information (same of different CCs) can be fixed (not configured), or can be configured to the UE.

Any of the above variation embodiments can be utilized independently or in combination with at least one other variation embodiment.

Figure 18:
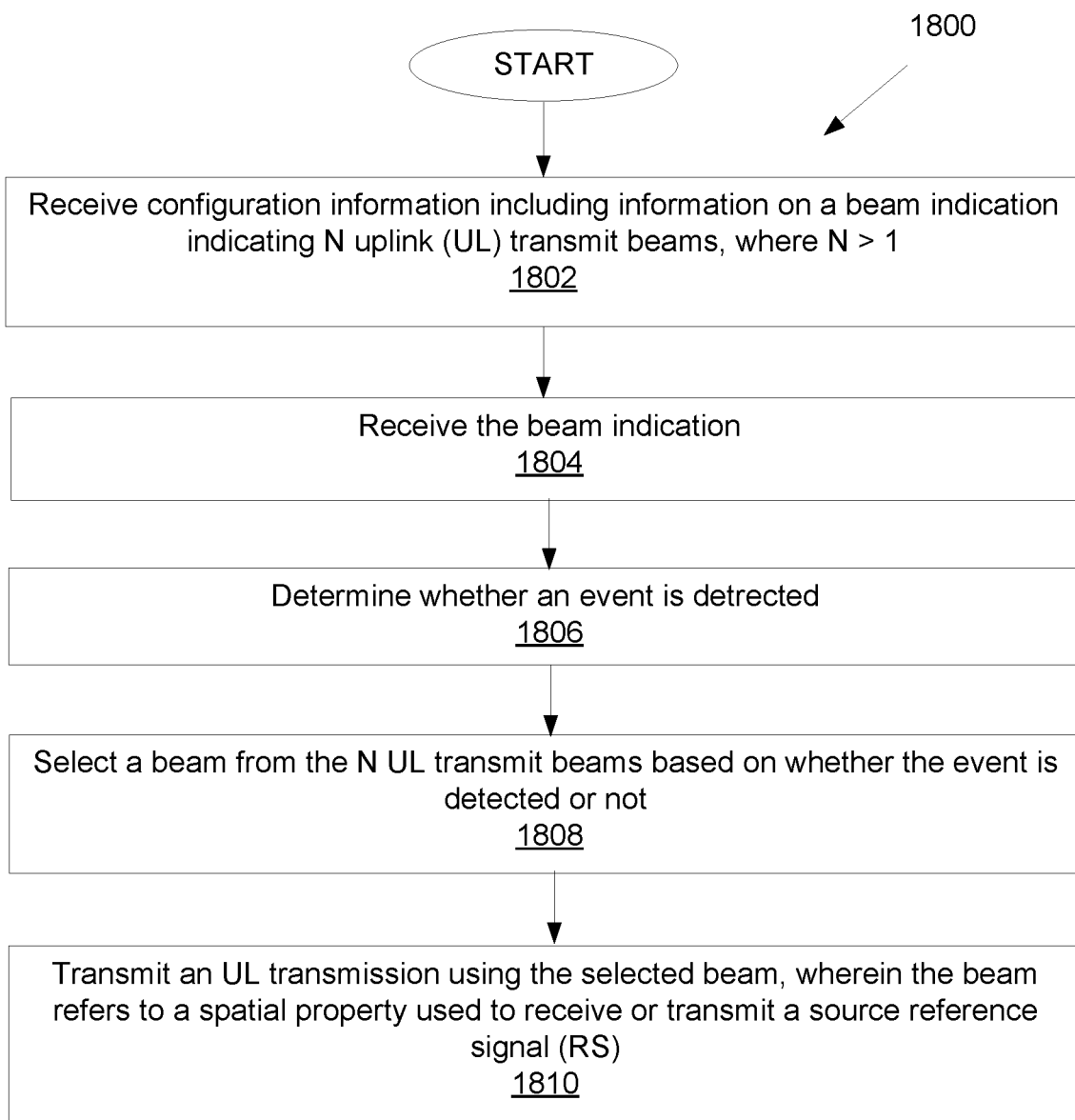
FIG. 18 illustrates a flow chart of a method for operating a UE according to embodiments of the present disclosure.

FIG. 18 illustrates a flow chart of a method 1800 for operating a user equipment (UE), as may be performed by a UE such as UE 116, according to embodiments of the present disclosure. The embodiment of the method 1800 illustrated in FIG. 18 is for illustration only. FIG. 18 does not limit the scope of this disclosure to any particular implementation.

As illustrated in FIG. 18, the method 1800 begins at step 1802. In step 1802, the UE (e.g., 111-116 as illustrated in FIG. 1) receives configuration information including information on a beam indication indicating N uplink (UL) transmit beams, where N>1.

In step 1804, the UE receives the beam indication.

In step 1806, the UE determines whether an event is detected.

In step 1808, the UE selects a beam from the N UL transmit beams based on whether the event is detected or not.

In step 1810, the UE transmits an UL transmission using the selected beam, wherein the beam refers to a spatial property used to receive or transmit a source reference signal (RS).

In one embodiment, the UE, in response to the event not being detected, selects a first beam from the N UL transmit beams as the beam, and in response to the event being detected, selects a second beam from the N UL transmit beams as the beam.

In one embodiment, the event detection is based on whether a maximum permissible exposure (MPE) limit is met or not.

In one embodiment, the UE is equipped with at least first and second antenna panels, and to determine whether the event is detected, the UE determines whether to switch from the first antenna panel to the second antenna panel.

In one embodiment, the beam is selected based on a priority order among the N UL transmit beams.

In one embodiment, the UE receives configuration information including information about measurement RS resources and information about a beam reporting, measures the measurement RS resources and calculates the beam reporting based on the measured measurement RS resources, and transmits the beam reporting, where the measurement RS resources comprise channel state information reference signals (CSI-RSs) or synchronization signal blocks (SSBs) or both CSI-RSs and SSBs, the beam reporting includes at least one resource indicator and a beam metric associated with the at least one resource indicator, and the beam indication is based on the beam reporting.

In one embodiment, the beam indication is via a transmission configuration indicator (TCI) state including at least one source RS.

In one embodiment, the beam indication is via N transmission configuration indicator (TCI) states, one TCI state for each of the N UL transmit beams, and each TCI state includes at least one source RS.

In one embodiment, the beam indication is via first and second transmission configuration indicator (TCI) states, TCI1 and TCI2, respectively, each of the first and second TCI states including at least one source RS, and the UE uses the TCI1 to determine one of the N UL transmit beams, and uses the TCI2 to determine remaining N−1 of the N UL transmit beams.

Figure 19:
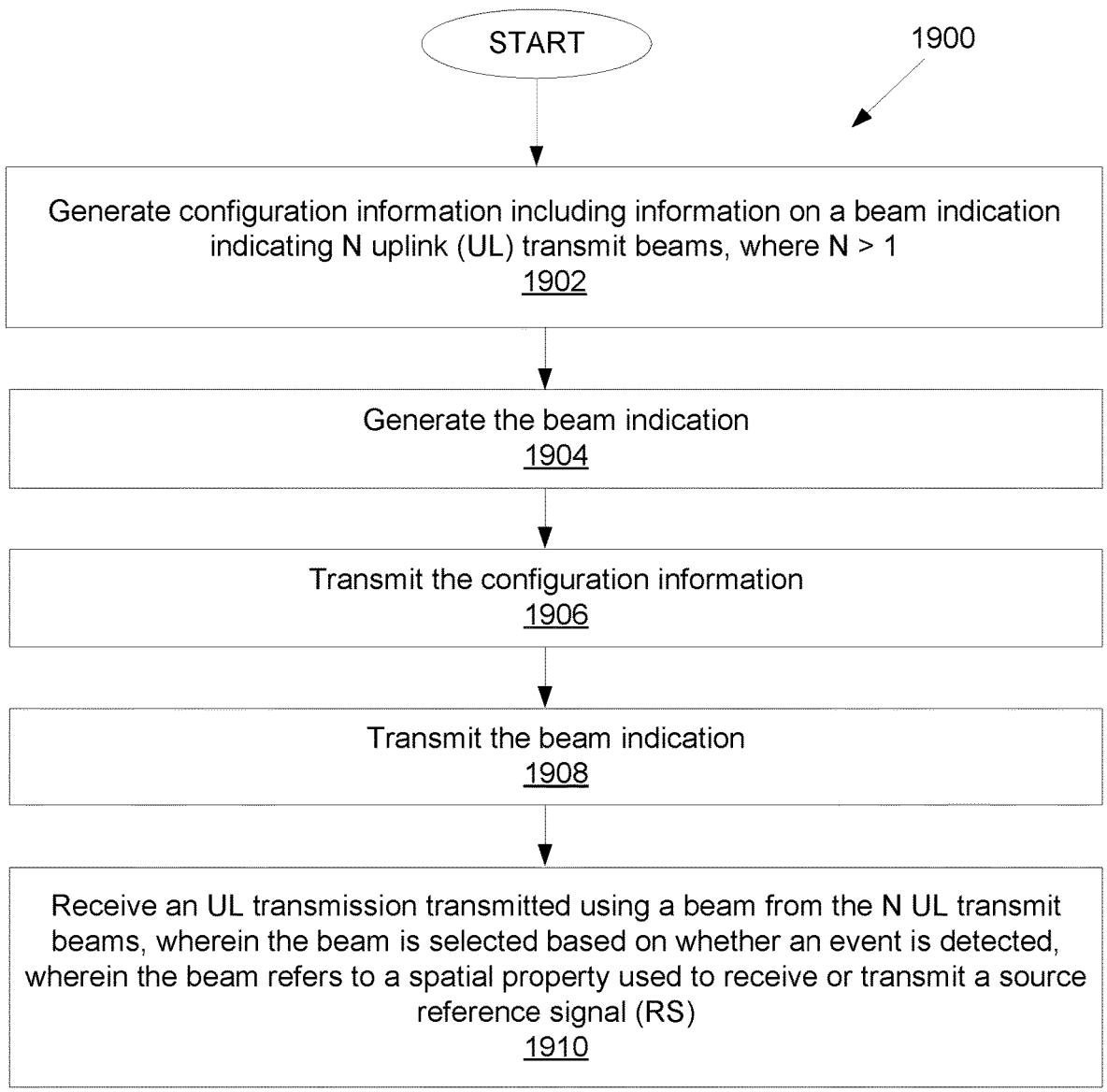
FIG. 19 illustrates a flow chart of a method for operating a BS according to embodiments of the present disclosure.

FIG. 19 illustrates a flow chart of another method 1900, as may be performed by a base station (BS) such as BS 102, according to embodiments of the present disclosure. The embodiment of the method 1900 illustrated in FIG. 19 is for illustration only. FIG. 19 does not limit the scope of this disclosure to any particular implementation.

As illustrated in FIG. 19, the method 1900 begins at step 1902. In step 1902, the BS (e.g., 101-103 as illustrated in FIG. 1), receives configuration information including information on a beam indication indicating N uplink (UL) transmit beams, where N>1.

In step 1904, the BS generates the beam indication.

In step 1906, the BS transmits the configuration information.

In step 1908, the BS transmits the beam indication.

In step 1910, the BS receives an UL transmission transmitted using a beam from the N UL transmit beams, wherein the beam is selected based on whether an event is detected, and wherein the beam refers to a spatial property used to receive or transmit a source reference signal (RS).

In one embodiment, if the event is not detected, the beam is a first beam from the N UL transmit beams, and if the event is detected, the beam is a second beam from the N UL transmit beams.

In one embodiment, the event detection is based on whether a maximum permissible exposure (MPE) limit is met or not.

In one embodiment, the beam is selected based on a priority order among the N UL transmit beams.

In one embodiment, the BS transmits configuration information including information about measurement RS resources and information about a beam reporting, transmits the measurement RS resources, and receives the beam reporting, wherein the measurement RS resources comprise channel state information reference signals (CSI-RSs) or synchronization signal blocks (SSBs) or both CSI-RSs and SSBs, the beam reporting includes at least one resource indicator and a beam metric associated with the at least one resource indicator, and the beam indication is based on the beam reporting.

In one embodiment, the beam indication is via a transmission configuration indicator (TCI) state including at least one source RS.

In one embodiment, the beam indication is via N transmission configuration indicator (TCI) states, one TCI state for each of the N UL transmit beams, and each TCI state includes at least one source RS.

In one embodiment, the beam indication is via first and second transmission configuration indicator (TCI) states, TCI1 and TCI2, respectively, each of the first and second TCI states including at least one source RS, the TCI1 indicates one of the N UL transmit beams, and the TCI2 indicates remaining N-1 of the N UL transmit beams.

The above flowcharts illustrate example methods that can be implemented in accordance with the principles of the present disclosure and various changes could be made to the methods illustrated in the flowcharts herein. For example, while shown as a series of steps, various steps in each figure could overlap, occur in parallel, occur in a different order, or occur multiple times. In another example, steps may be omitted or replaced by other steps.

Although the present disclosure has been described with an exemplary embodiment, various changes and modifications may be suggested to one skilled in the art. It is intended that the present disclosure encompass such changes and modifications as fall within the scope of the appended claims. None of the description in this application should be read as implying that any particular element, step, or function is an essential element that must be included in the claims scope. The scope of patented subject matter is defined by the claims.

What is claimed is:

1. A user equipment (UE) comprising:
a transceiver configured to:
receive configuration information including information on a beam indication indicating N uplink (UL) transmit beams, where N>1, and
receive the beam indication; and
a processor operably coupled to the transceiver, the processor configured to:
determine whether an event is detected,
select a beam from the N UL transmit beams based on whether the event is detected or not,
in response to the event not being detected, select a first beam from the N UL transmit beams as the beam, and
in response to the event being detected, select a second beam from the N UL transmit beams as the beam, and
wherein the transceiver is further configured to transmit an UL transmission using the selected beam, and
wherein each beam from the N UL transmit beams refers to a spatial property used to receive or transmit a source reference signal (RS).

2. The UE of claim 1, wherein the event detection is based on whether a maximum permissible exposure (MPE) limit is met or not.

3. The UE of claim 1, wherein:
the UE is equipped with at least first and second antenna panels, and
the processor is further configured to determine that the event is detected based on a determination to switch from the first antenna panel to the second antenna panel.

4. The UE of claim 1, wherein the beam is selected based on a priority order among the N UL transmit beams.

5. The UE of claim 1, wherein:
the transceiver is configured to receive configuration information including information about measurement RS resources and information about a beam reporting,
the processor is configured to measure the measurement RS resources and calculate the beam reporting based on the measured measurement RS resources,
the transceiver is further configured to transmit the beam reporting,
the measurement RS resources comprise channel state information reference signals (CSI-RSs) or synchronization signal blocks (SSBs) or both CSI-RSs and SSBs,
the beam reporting includes at least one resource indicator and a beam metric associated with the at least one resource indicator, and
the beam indication is based on the beam reporting.

6. The UE of claim 1, wherein the beam indication is via a transmission configuration indicator (TCI) state including at least one source RS.

7. The UE of claim 1, wherein the beam indication is via N transmission configuration indicator (TCI) states, one TCI state for each of the N UL transmit beams, and each TCI state includes at least one source RS.

8. The UE of claim 1, wherein:
the beam indication is via first and second transmission configuration indicator (TCI) states, TCI1 and TCI2, respectively, each of the first and second TCI states including at least one source RS, and
the processor is configured to:
use the TCI1 to determine one of the N UL transmit beams, and use the TCI2 to determine remaining N−1 of the N UL transmit beams.

9. A base station (BS) comprising:
a processor configured to:
   generate configuration information including information on a beam indication indicating N uplink (UL) transmit beams, where N>1, and
   generate the beam indication; and
a transceiver operably coupled to the processor, the transceiver configured to:
   transmit the configuration information,
   transmit the beam indication, and
   receive an UL transmission transmitted using a beam from the N UL transmit beams, wherein the beam is selected based on whether an event is detected,
   wherein if the event is not detected, the beam is a first beam from the N UL transmit beams,
   wherein if the event is detected, the beam is a second beam from the N UL transmit beams, and
   wherein each beam from the N UL transmit beams refers to a spatial property used to receive or transmit a source reference signal (RS).

10. The BS of claim 9, wherein the event detection is based on whether a maximum permissible exposure (MPE) limit is met or not.

11. The BS of claim 9, wherein the beam is selected based on a priority order among the N UL transmit beams.

12. The BS of claim 9, wherein:
the transceiver is configured to:
   transmit configuration information including information about measurement RS resources and information about a beam reporting,
   transmit the measurement RS resources, and
   receive the beam reporting,
the measurement RS resources comprises channel state information reference signal (CSI-RSs) or synchronization signal blocks (SSBs) or both CSI-RSs and SSBs,
the beam reporting includes at least one resource indicator and a beam metric associated with the at least one resource indicator, and
the beam indication is based on the beam reporting.

13. The BS of claim 9, wherein the beam indication is via a transmission configuration indicator (TCI) state including at least one source RS.

14. The BS of claim 9, wherein the beam indication is via N transmission configuration indicator (TCI) states, one TCI state for each of the N UL transmit beams, and each TCI state includes at least one source RS.

15. The BS of claim 9, wherein:
the beam indication is via first and second transmission configuration indicator (TCI) states, TCI1 and TCI2, respectively, each of the first and second TCI states including at least one source RS,
the TCI1 indicates one of the N UL transmit beams, and
the TCI2 indicates remaining N−1 of the N UL transmit beams.

16. A method for operating a user equipment (UE), the method comprising:
   receiving configuration information including information on a beam indication indicating N uplink (UL) transmit beams, where N>1;
   receiving the beam indication;
   determining whether an event is detected;
   selecting a beam from the N UL transmit beams based on whether the event is detected or not;
   in response to the event not being detected, selecting the beam to be a first beam from the N UL transmit beams; and
   in response to the event being detected, selecting the beam to be a second beam from the N UL transmit beams; and
   transmitting an UL transmission using the selected beam,
   wherein each beam from the N UL transmit beams refers to a spatial property used to receive or transmit a source reference signal (RS).

17. The method of claim 16, wherein the beam indication is via a transmission configuration indicator (TCI) state including at least one source RS.

18. The method of claim 16, wherein the beam indication is via first and second transmission configuration indicator (TCI) states, TCI1 and TCI2, respectively, each of the first and second TCI states including at least one source RS, the method further comprising:
   using the TCI1 to determine one of the N UL transmit beams, and
   using the TCI2 to determine remaining N−1 of the N UL transmit beams.

19. The method of claim 16, further comprising selecting the beam based on a priority order among the N UL transmit beams.

20. The method of claim 16, further comprising:
   receiving configuration information including information about measurement RS resources and information about a beam reporting;
   measuring the measurement RS resources and calculating the beam reporting based on the measured measurement RS resources; and
   transmitting the beam reporting,
wherein:
   the measurement RS resources comprise channel state information reference signals (CSI-RSs) or synchronization signal blocks (SSBs) or both CSI-RSs and SSBs,
   the beam reporting includes at least one resource indicator and a beam metric associated with the at least one resource indicator, and
   the beam indication is based on the beam reporting.

* * * * *